United States Patent
Itoh

(10) Patent No.: US 7,023,102 B2
(45) Date of Patent: Apr. 4, 2006

(54) POWER GENERATION CONTROLLER FOR AC GENERATOR

(75) Inventor: Yasumitsu Itoh, Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 73 days.

(21) Appl. No.: 10/794,569

(22) Filed: Mar. 5, 2004

(65) Prior Publication Data

US 2004/0174018 A1 Sep. 9, 2004

(30) Foreign Application Priority Data

Mar. 6, 2003 (JP) .............................. 2003-060058

(51) Int. Cl.
F02M 51/00 (2006.01)
H02P 9/00 (2006.01)
H02P 9/04 (2006.01)
F02N 11/06 (2006.01)

(52) U.S. Cl. .................. 290/40 C; 290/20; 322/28; 322/29

(58) Field of Classification Search ............... 290/20, 290/40 C; 322/16, 20, 27–29
See application file for complete search history.

(56) References Cited

U.S. PATENT DOCUMENTS

| | | | | |
|---|---|---|---|---|
| 4,328,454 A | * | 5/1982 | Okuyama et al. | 318/803 |
| 4,680,529 A | * | 7/1987 | Komurasaki et al. | 322/28 |
| 4,816,985 A | * | 3/1989 | Tanahashi | 363/81 |
| 4,839,576 A | * | 6/1989 | Kaneyuki et al. | 322/25 |
| 4,984,147 A | * | 1/1991 | Araki | 363/84 |
| 5,018,058 A | * | 5/1991 | Ionescu et al. | 363/34 |
| 5,177,677 A | * | 1/1993 | Nakata et al. | 363/89 |
| 5,255,175 A | * | 10/1993 | Uchino | 363/81 |
| 5,256,959 A | | 10/1993 | Nagano et al. | 322/25 |
| 5,500,575 A | * | 3/1996 | Ionescu | 315/307 |
| 5,543,703 A | * | 8/1996 | Kusase et al. | 322/16 |
| 5,550,457 A | * | 8/1996 | Kusase et al. | 322/29 |
| 5,654,882 A | * | 8/1997 | Kanazawa et al. | 363/37 |
| 5,663,631 A | * | 9/1997 | Kajiura et al. | 322/29 |
| 5,719,484 A | * | 2/1998 | Taniguchi et al. | 322/20 |
| 5,719,486 A | * | 2/1998 | Taniguchi et al. | 322/28 |
| 5,723,973 A | * | 3/1998 | Umeda et al. | 322/20 |
| 5,726,558 A | * | 3/1998 | Umeda et al. | 322/27 |
| 5,726,559 A | * | 3/1998 | Taniguchi et al. | 322/34 |
| 5,739,677 A | * | 4/1998 | Tsutsui et al. | 322/25 |
| 5,939,794 A | * | 8/1999 | Sakai et al. | 290/40 A |
| 6,013,992 A | * | 1/2000 | Ishikawa et al. | 318/376 |

(Continued)

FOREIGN PATENT DOCUMENTS

JP 02-067076 12/1991

*Primary Examiner*—Darren Schuberg
*Assistant Examiner*—Pedro J. Cuevas
(74) *Attorney, Agent, or Firm*—Flynn, Thiel, Boutell & Tanis, P.C.

(57) ABSTRACT

A power generation controller for an AC generator detects the state of a battery and an electric load to control the output of the AC generator. A current detector detects a current to be used by an electric load on the vehicle. The controller includes a field current control section, a field current monitor section, and an output control section. The field current control section controls a field current of the AC generator. The field current monitor section monitors a field current duty value which is a controlled state of the field current of the AC generator. The output control section corrects the output of the AC generator according to the field current duty value, monitored by the field current monitor section, and/or the load current value, detected by the current detector.

16 Claims, 16 Drawing Sheets

U.S. PATENT DOCUMENTS

| | | | |
|---|---|---|---|
| 6,048,288 A * | 4/2000 | Tsujii et al. | 477/5 |
| 6,124,690 A * | 9/2000 | Yano et al. | 318/376 |
| 6,127,813 A * | 10/2000 | Tamagawa | 322/16 |
| 6,135,914 A * | 10/2000 | Yamaguchi et al. | 477/3 |
| 6,186,255 B1 * | 2/2001 | Shimasaki et al. | 180/65.3 |
| 6,203,468 B1 * | 3/2001 | Nitta et al. | 477/5 |
| 6,242,873 B1 * | 6/2001 | Drozdz et al. | 318/139 |
| 6,330,498 B1 * | 12/2001 | Tamagawa et al. | 701/22 |
| 6,334,079 B1 * | 12/2001 | Matsubara et al. | 701/22 |
| 6,346,797 B1 * | 2/2002 | Perreault et al. | 322/29 |
| 6,362,536 B1 * | 3/2002 | Izumiura et al. | 290/40 C |
| 6,382,335 B1 * | 5/2002 | Takashima et al. | 180/65.2 |
| 6,424,053 B1 * | 7/2002 | Wakashiro et al. | 290/40 C |
| 6,437,456 B1 * | 8/2002 | Kimura et al. | 290/40 C |
| 6,443,126 B1 * | 9/2002 | Morimoto et al. | 123/339.15 |
| 6,563,230 B1 * | 5/2003 | Nada | 290/40 C |
| 6,570,266 B1 * | 5/2003 | Wakashiro et al. | 290/40 C |
| 6,671,195 B1 * | 12/2003 | Perreault et al. | 363/89 |
| 6,687,580 B1 * | 2/2004 | Suzuki et al. | 701/22 |
| 6,741,067 B1 * | 5/2004 | Taniguchi et al. | 322/28 |
| 6,784,563 B1 * | 8/2004 | Nada | 290/40 C |
| 6,862,511 B1 * | 3/2005 | Phillips et al. | 701/54 |
| 6,907,337 B1 * | 6/2005 | Phillips et al. | 701/51 |
| 6,912,142 B1 * | 6/2005 | Keim et al. | 363/89 |
| 6,915,198 B1 * | 7/2005 | Phillips et al. | 701/54 |
| 6,924,629 B1 * | 8/2005 | Mueller et al. | 322/28 |
| 6,927,500 B1 * | 8/2005 | Iwanami et al. | 290/40 C |
| 6,930,405 B1 * | 8/2005 | Gunji | 290/40 C |
| 6,933,705 B1 * | 8/2005 | Howes | 322/29 |
| 6,934,610 B1 * | 8/2005 | Wakashiro et al. | 701/22 |
| 6,936,934 B1 * | 8/2005 | Morimoto et al. | 307/9.1 |
| 6,937,484 B1 * | 8/2005 | Nakamura et al. | 363/36 |
| RE38,790 E * | 9/2005 | Maeda et al. | 290/40 C |
| 6,943,460 B1 * | 9/2005 | Wakashiro et al. | 290/40 C |
| 6,949,897 B1 * | 9/2005 | Wakashiro et al. | 318/139 |
| 6,949,902 B1 * | 9/2005 | Nakayama et al. | 318/432 |
| 6,952,057 B1 * | 10/2005 | Tajima et al. | 290/40 C |
| 6,954,052 B1 * | 10/2005 | Fujita et al. | 322/28 |
| 6,956,298 B1 * | 10/2005 | Kitajima et al. | 290/40 C |
| 6,965,173 B1 * | 11/2005 | Fukasaku et al. | 290/40 C |

* cited by examiner

REGENERATIVE GENERATION DURING DECELERATION
→ ALTERNATOR-CUT CONTROL

POWER GENERATION CONTROLLER FOR AC GENERATOR

FIELD OF THE INVENTION

This invention relates to power generation controllers for AC generators, and more particularly to a power generation controller for the AC generator to control an alternator, i.e., AC generator, for a vehicle.

BACKGROUND OF THE INVENTION

In vehicles, power consumption of electric loads such as indicators, blinkers, blowers, wipers, and air conditioners are typically supplied from a battery. An alternator as an AC generator is driven by driving force from an engine to generate electric power to charge the battery.

The alternator is connected to an engine side through a belt entrained around a crank pulley of a crankshaft of an engine, and is driven by rotation of the crankshaft to generate power. To restrain or cover the variation in the electric load including the battery, the current passing through a field coil (primary field coil) is changed according to the voltage fluctuations. By this configuration, inside of the alternator, the power generation current is self-changed to achieve a power supply to the system without discharge of the battery.

However, the alternator imposes a corresponding load on the engine. Engine control by the usual increase in idle air quantity (ISC control) cannot sufficiently cover the quick electric load variations. This results in hunting or reduces engine speed, and may cause the engine to stall if the worst happens.

While the battery supplies power to cover the load which could not be dealt with by the alternator, the battery is soon charged by the alternator under control of a regulator circuit. With usual control of the alternator, there is no allowance for the battery to receive regenerative current during deceleration of the vehicle, which is disadvantageous in that the deceleration energy is not effectively utilized.

To obviate these inconveniences, the three following methods are usually provided.

In a first control method, prevention of the power generation of the alternator (i.e., power generation cut or alternator-cut) is generally employed. By controlling a terminal C (switch for switching the voltage of the alternator), the alternator decreases in voltage output and is prevented from power generation (actually the power generation is reduced). A second control method is an FR (or FD; field duty) direct control to directly control the alternator by the signal from a controller (engine controller; ECM) to the field coil (primary coil) itself. A third control method is an FR duty control (or field current duty (FD) control) to change a duty ratio of a rectangular-wave current generated by the regulator circuit built in the alternator so as to cover the variation in requirement of the load including the battery. Decision of the timing of power generation cut of the alternator determines the duration of the power generation cut in accordance with the voltage, which is detected as a duty ratio so that a state of the battery can be detected. Alternatively, these methods can be appropriately combined to deal with the problem.

In view of that, the generator in operation becomes a mechanical load on the engine, some of these power generation controllers for the vehicle control a field current, which controls the operation of the generator, with a certain pattern to cover the variation in the mechanical load on the engine (see JP-2528995).

In a conventional power generation controller for the alternator of the first method in which power generation cut (charge cut) of the alternator is executed, a torque required for the engine varies largely when canceling the power generation cut by the terminal C. To avoid this variation in torque, it is generally required that the alternator generates power gradually (by gradual excitation). Particularly, this gradual excitation is required during an idle speed operating condition where only low engine power can be output. However, the loads vary continuously so that an idle speed controller cannot learn an idle air quantity, thereby limiting engine startup.

With the second FR direct control method, it is required to detect states of the battery and the loads, which are generally detected by usual methods, by another method so as to directly control the alternator. For example, the states of the battery and the loads can be detected, since the voltage decreases when variation in the electric loads occurs. However, the states thereof cannot be detected while vehicle speed is increasing, since the capacity of the alternator increases with increase in the engine speed and the variation in the electric loads becomes small. It is therefore difficult to determine the exact status.

Further, with the third control method, the FR duty control is performed in combination with the first control, namely the power generation cut of the alternator. If the alternator is prevented from power generating (charge cut) by the terminal C, the condition of the battery can be detected due to the battery being in a discharge state without the electric loads. But this can be applied only under a constant electric load, since combinations of the electric loads and the states of the battery effect this determination. Also, if the alternator is not prevented from power generating by the terminal C, it cannot be determined from FD (field duty) whether FD is generated only for electric load, or in addition to this, for charging the battery. Therefore, switches are undesirably required to determine the electric loads to ensure protection of the battery.

In the power generation controller for the alternator, there is also a problem in which the alternator requires the engine to produce relatively large torque during idle speed operation where the engine speed is low, thereby deteriorating stability of the idle speed operation. By increasing intake air at idle speed (ISC; idle speed control), the engine speed can often be increased to deal with the electric loads. However, abuse of this increase deteriorates fuel economy.

Further, in the power generation controller for the alternator, current through the field coil (primary coil) of the alternator is changed according to a duty ratio of rectangular-wave current generated from the built-in regulator circuit so as to cover the variation in load requirements. Power generation starts when the speed of the internal combustion engine cranked by a starter at engine startup exceeds speed for minimum power generation current, which deteriorates startability. This is because the alternator is self-controlled. An additional function is desired to prevent the power generation at engine startup.

During idle speed operation in which the engine speed is low, the alternator requires relatively large engine torque, thereby deteriorating stability of the idle speed operation. There is often an undesirable increase of the idle engine speed when the duty ratio of current through the field coil (primary coil) is increased for the electric load.

Still further, the battery provides power to the electric load that is not covered by the alternator. The battery is soon charged by the control of the regulator circuit of the alternator. Accordingly, there is no allowance for the battery to receive regenerative current during deceleration of the vehicle, which is disadvantageous in that the deceleration energy is not effectively utilized.

SUMMARY OF THE INVENTION

In order to obviate or at least minimize the above inconvenience, the present invention provides a power generation controller for an AC generator. The AC generator is driven by an internal combustion engine mounted on a vehicle and charges a battery. A controller controls the output of the AC generator according to an external input duty signal value and a battery voltage which change in accordance with a running state of the vehicle and/or a driving state of the engine. A current detector detects a current to be used by an electric load on the vehicle. A controller includes a field current control section, a field current monitor section, and an output control section. The field current control section controls a field current of the AC generator. The field current monitor section monitors a field current duty value which is a controlled state of the field current of the AC generator. The output control section corrects the output of the AC generator according to the field current duty value, monitored by the field current monitor section, and/or the load current value, detected by the current detector.

According to the present invention, the output controller corrects the output of the AC generator according to the field current duty value and/or the load current value. The output of the AC generator is controlled based on the detected states of the battery and the electric loads. This does not affect life of the battery, and the power generation cut control can be executed to the maximum, and fuel economy is improved.

DETAILED DESCRIPTION

Figure 1:
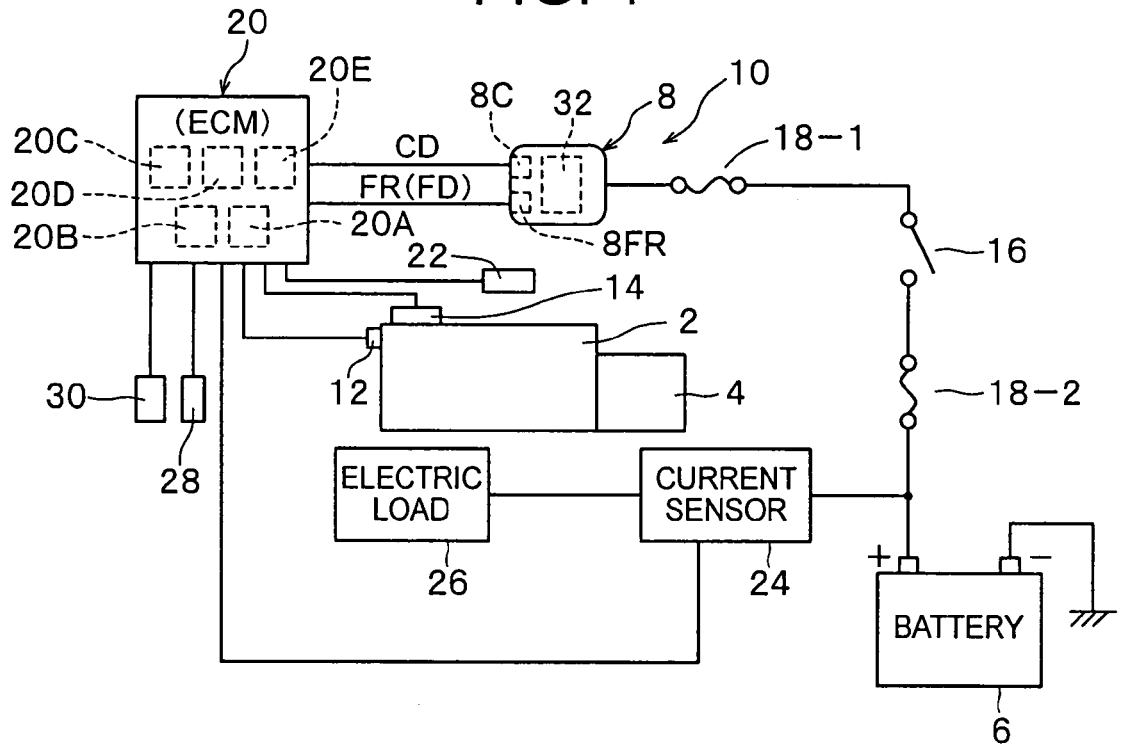
FIG. 1 is a diagram showing a system of a power generation controller according to a first embodiment.

The present invention will now be described in specific detail with reference to the accompanying drawings. FIGS. 1–15 illustrate a first embodiment of this invention. FIG. 1 shows an engine 2 mounted on a vehicle (not shown), a transmission 4 in connection with the engine 2, and a battery 6. The vehicle is provided with a power generation controller 10 having an alternator 8 as an AC generator. The engine 2 is provided with a fuel injection valve 12 and an idle intake air controller 14 (idle speed controller).

The alternator 8 includes a terminal C duty control (chopper control), and FD (field current duty; or FR) terminal control. Activation of the terminal C brings the voltage to the lower side (Lo) and the alternator 8 is deactivated, i.e., the power generation by the alternator 8 is prevented (power generation cut). Duration of the deactivation of the terminal C (i.e. activation of the alternator 8) increases and decreases based on comparison with the battery voltage in a state when the alternator 8 is activated. The regulator circuit does not produce a pulse as a normal alternator, but CD (terminal C duty) on a side of a controller 20 produces the pulse.

The alternator 8 is connected to a positive terminal of the battery 6 through an ignition switch 16. Battery 6 has a negative terminal of the battery connected to a ground. A first fuse 18-1 is positioned between the alternator 8 and the ignition switch 16, and a second fuse 18-2 is positioned between the ignition switch 16 and the battery 6. Thereby, the alternator 8 is driven by the engine 2 and charges the battery 6.

Engine 2 is connected to the controller (ECM) 20. Controller 20 is provided with an idle air control section 20A which controls the idle intake air quantity controller (idle speed controller) 14, and with a fuel cut control section 20B to perform a fuel cut (stop fuel supply to the engine 2) when a predetermined fuel cut condition is satisfied during deceleration of the vehicle. Such fuel cuts can be controlled by a hybrid vehicle control system.

The controller 20 is also connected to the fuel injection valve 12, the idle air controller (ISC) 14, a starter 22, and a clamp-type current sensor 24 as a current detector. Current sensor 24 is connected to an electric load 26 to detect load current value to be used by the electric load 26, and is also disposed toward the battery 6 side with respect to the second fuse 18-2.

Further, the controller 20 is connected to an idle switch 28 which is activated upon the engine 2 during an idle speed operation, and an accelerator switch 30 which is activated when an accelerator pedal (not shown) is depressed.

The controller 20 includes a field current control section 20C, a field current monitor section 20D, and an output control section 20E. The field current control section 20C controls a field current of the alternator 8, which comprises the AC generator. The field current monitor section 20D monitors a field current duty value FD which is a controlled state of the field current of the alternator 8. The output control section 20E corrects the output of the AC generator according to the field current duty value, monitored by the field current monitor section 20D, and/or the load current value, detected by the current sensor 24.

Based on an external input duty value (CD signal; terminal C duty) and the battery voltage which depends on the running state of the vehicle and/or the driving state of the engine 2, the controller 20 controls the field current of the alternator 8. The output control section 20E controls output of the alternator 8.

In the field current control section 20C, the field current control is performed by activation/deactivation of a power transistor (not shown) based on both 1) an output value compared between the battery voltage and a reference voltage and 2) the external input duty signal value input to the C terminal 8C (CD signal; duty signal for power generation cut; 0–100%) of the alternator 8. Specifically, the field current is prevented from passing when the voltage of the battery is greater than that of the reference voltage. Duty of the field current is controlled by the CD signal (duty signal).

During start and acceleration of the vehicle, the controller 20 of the output control section 20E prevents power generation of the alternator 8 when a gear in the transmission 4 is changed from low speed to second speed and when the electric load current value detected by the current sensor 24 is smaller than a reference value.

During deceleration of the vehicle, the control section 20E of the controller 20 permits the power generation of the alternator 8 simultaneously with the fuel cut control of the engine 2.

Further, the controller 20 changes the external input duty signal value (CD signal value) to a predetermined value when the electric load of the engine is detected by the current sensor 24.

Referring to FIG. 1, the alternator 8 includes the C terminal 8C (voltage switching terminal) and an FR terminal 8FR, and the regulator circuit 32.

Figure 2:
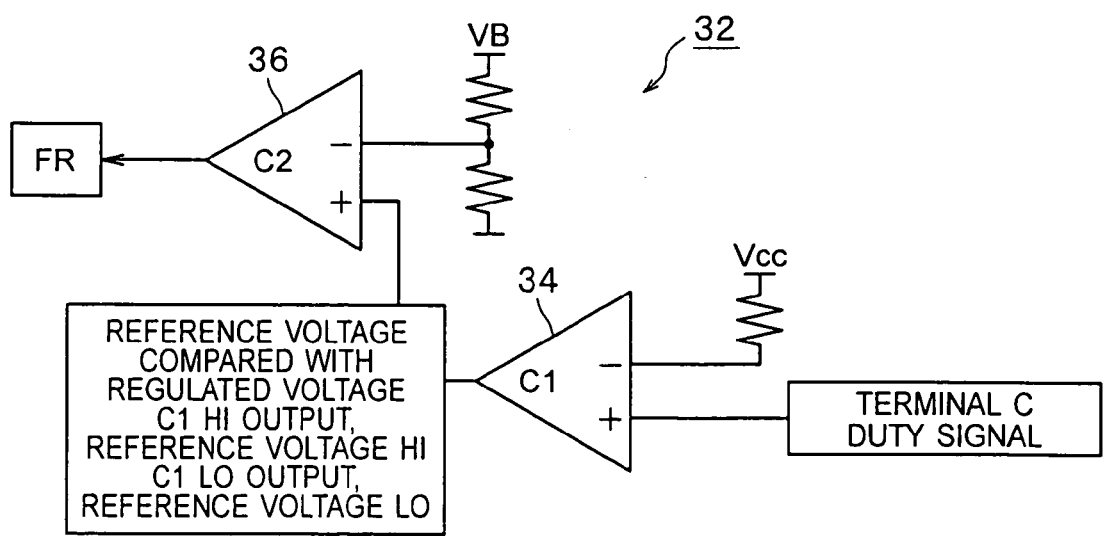
FIG. 2 is a diagram showing a regulator circuit in an alternator according to the first embodiment.

Referring to FIG. 2, the regulator circuit 32 includes a first comparator (C1) 34 which receives the C terminal duty signal value (CD signal) or the external input duty signal value, and a second comparator (C2) 36 in connection to the first comparator 34. First comparator 34 receives at a positive terminal the C terminal duty value (CD signal), and at a negative terminal the controlled voltage (Vcc) output from the alternator 8. First comparator 34 compares the C terminal duty signal value (CD signal) with the controlled voltage (Vcc) and supplies a reference voltage Hi (Hi signal) or a reference voltage Lo (Lo signal) to the positive terminal of the second comparator 36. Second comparator 36 compares the reference voltage with the voltage of the battery (VB), and supplies the FR duty signal (FD signal) as the field current duty value (FR signal value) to the controller 20.

Specifically, in the alternator 8, the C terminal 8C is a switch to change the voltage between 12.8-volts and 14.5-volts, and receives the C terminal duty signal (CD signal) as the external input duty signal. Thus, the regulator circuit 32 depends on this C terminal duty signal. More particularly, if the reference voltage is below 12.8-volt, the battery 6 is charged according to a potential difference irrespective of the C terminal duty signal, whereas if the reference voltage is at or above 14.5-volt, the alternator 8 does not generate power.

For example, even if the first comparator 34 supplied the Lo 12.8-volt signal to the second comparator 36, the battery 6 is charged at Hi voltage if the reference voltage is below 12.8-volts. Therefore, the battery 6 can be charged if the battery voltage is between 12.8-volts and 14.5-volts, which protects the battery 6. In this range, the second comparator 36 which outputs an FD signal is activated/deactivated based on the C terminal duty signal (CD signal), and is synchronized with the C terminal duty signal (CD signal). By permitting the CD signal and the FD signal to be equal, the FR duty signal (FD signal) is not changed until the average voltage is below 12.8-volts during the load fluctuations. In this range, the variation of the output can be obtained between the discharge and the charge of the battery 6. Discharge and charge control can be achieved while maintaining the stability of the idle driving. In this first embodiment, provided that the battery 8 is discharged and the regenerative power generation is obtained, the load of the alternator 8 is decreased to decrease load on the engine, thereby effectively improving fuel economy. There is no need to set an upper limit in particular.

Operation of the first embodiment of the present invention is explained below.

Figure 3:
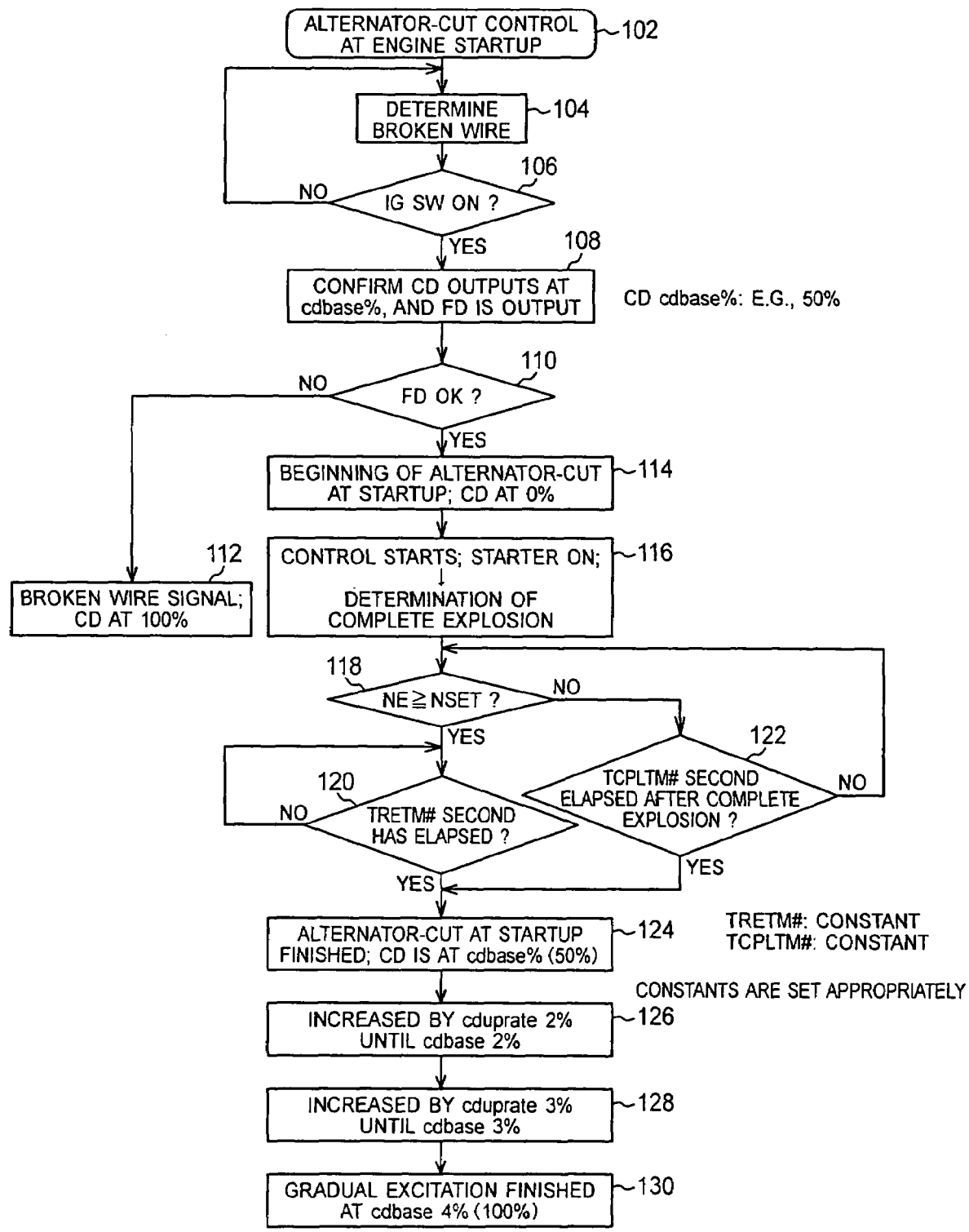
FIG. 3 is a flowchart of power generation cut control of the alternator at engine startup according to the first embodiment.

Referring to FIG. 3, a program for the power generation cut control of the alternator 8 at engine startup starts at step 102. Whether there is a broken wire is determined at step 104. Then a determination is made at step 106 as to whether or not the ignition switch 16 is activated (IG SW ON). If the determination at step 106 is "NO", the program returns to the previous step 104.

If the determination at step 106 is "YES", then it is confirmed that the external input duty value (CD signal value) is output at "cdbase %", e.g., 50% and the FD signal is also output (step 108).

Also, it is determined at step 110 whether or not this FD signal is OK. If the determination at step 110 is "NO", CD signal is set at 100% as a broken wire signal (step 112).

If the determination at step 110 is "YES", the power generation cut of the alternator 8 at the start of the engine 2 begins, and the CD value is set at 0% (step 114).

Then the starter 22 is activated and it is determined at step 116 whether or not there is a complete explosion or firing/ starting of the engine 2.

Then it is determined at step 118 whether NE (engine speed) is at or above NSET (target engine speed, for example 2,000 rpm). If the determination at step 118 is "YES", then another determination is made at step 120 whether a predetermined time (TRETM# second) has elapsed. If the determination at step 120 is "NO", this determination is repeated.

If the determination at step 118 is "NO", then another determination is made at step 122 whether a predetermined time (TCPLTM# second) has elapsed from the complete firing of the engine 2. If the determination at step 120 is "NO", the program returns to the previous step 118.

If the determination at step 120 or 122 is "YES", then power generation cut of the alternator 8 at engine startup is completed (power generation starts), and CD is set at "cdbase" % (50%) (step 124).

CD is increased by "cduprate" 2% each time until the "cdbase" is at 2% (step 126). CD is increased by "cduprate" 3% each time until the "cdbase" is at 3% (step 128). The gradual power generation is finished when the "cdbase" is at 4% (100%) (step 130).

Figure 4:
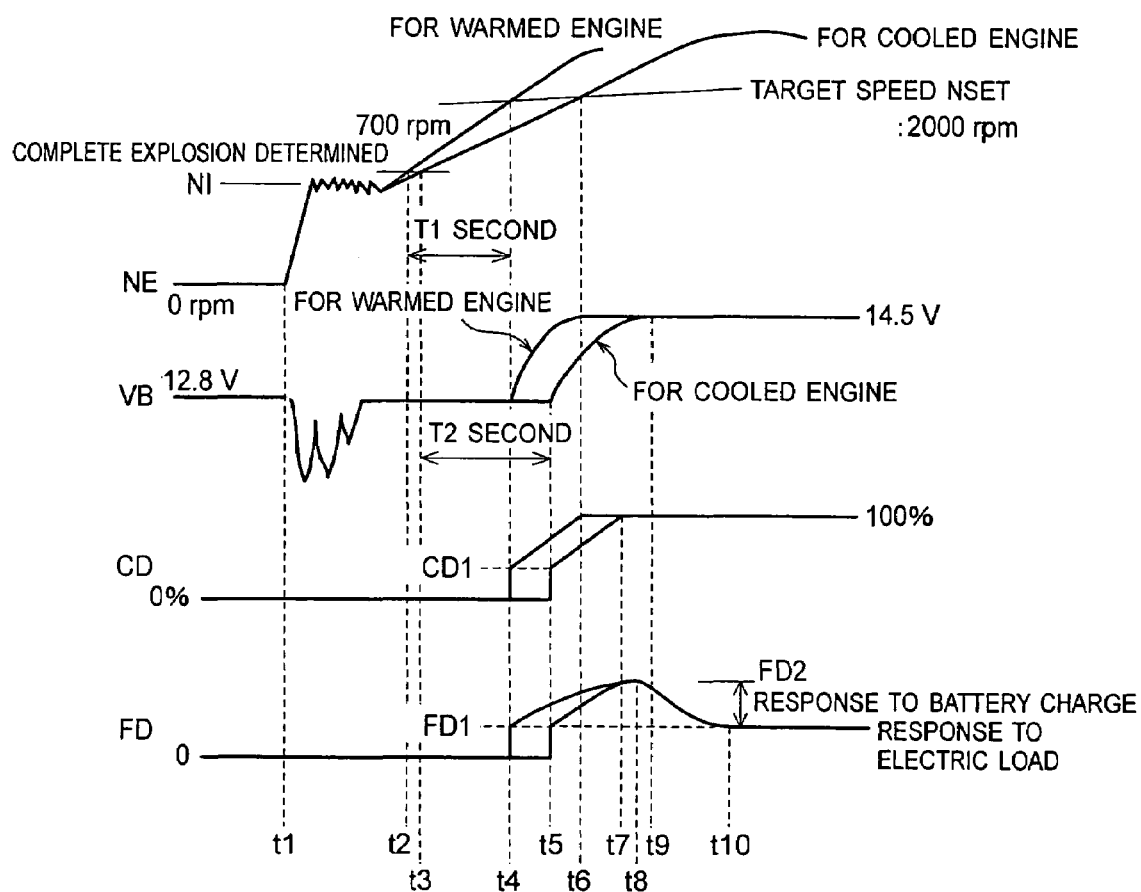
FIG. 4 is a timing chart of power generation cut control of the alternator at engine startup according to the first embodiment.

FIG. 4 shows a timing chart of the power generation cut control of the alternator 8 at engine startup. Engine speed (NE) is at 0 rpm and the battery voltage (VB) is at 12.8-volts and external or reference duty signal value (CD) is at 0% and the field current duty value (FD) is at 0% before activation of the ignition switch 16 (before time t1). When the ignition switch 16 is activated (time t1), the engine 2 starts cranking and the engine speed increases to a certain speed N1, and the battery voltage decreases.

For a warmed engine case, a determination of the complete explosion or start (700 rpm) is made at time t2 when a certain time has elapsed from time t1. A certain time T1 is a time between the determination of the complete engine starting and the engine speed increase to the target engine speed (NSET: 2,000 rpm). After the time T1 (i.e., at time t4), CD increases to a certain value CD1 and FD increases to a certain value FD1, and the battery voltage increases gradually. At time t6 when a certain time has elapsed from time t4, CD is at 100%, and the battery voltage is at 14.5-volts, and FD increases gradually and reaches a maximum value FD2 at time t8.

For a cold engine case, a determination of the complete explosion or starting is made at time t3 when a certain time has elapsed from time t1. A certain time T2 is a time between the determination of complete starting and the engine speed increase to the target engine speed (NSET). After the time T2, CD increases to the certain value CD1 and FD increases to the certain value FD1, and the battery voltage increases gradually. At time t7 when a certain time has elapsed from time t5, CD is at 100%, and FD increases gradually and reaches the maximum value at time t8, and the battery voltage is at 14.5-volts at time t9. Then the battery voltage is maintained at 14.5volts, and CD is maintained at 100%. FD decreases to the certain value FD1 from the maximum value at time t10. The difference between the maximum value FD2 and the certain value FD1 corresponds to the response for the battery charge.

Figure 5:
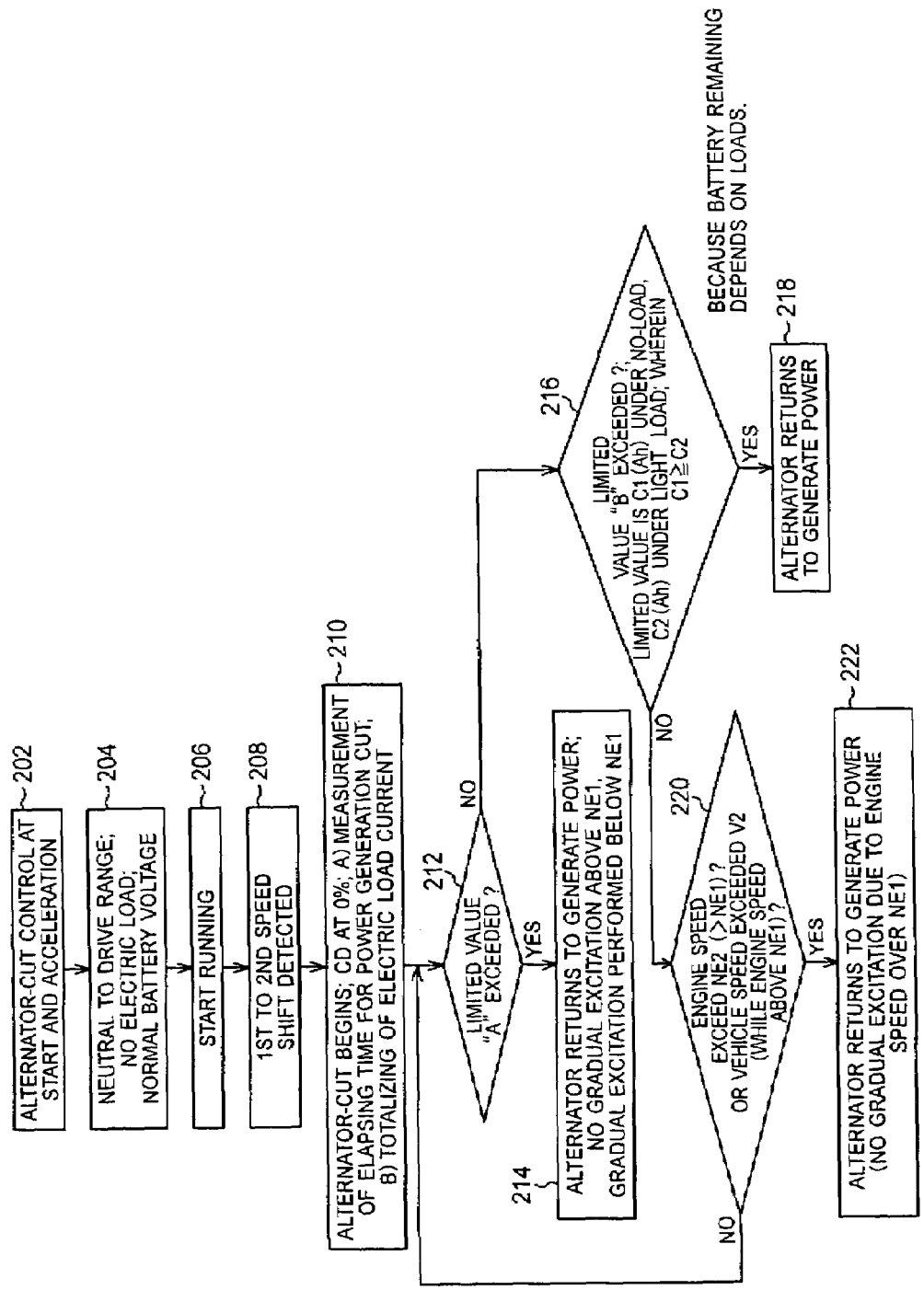
FIG. 5 is a flowchart of power generation cut control of the alternator at start and acceleration of the vehicle according to the first embodiment.

FIG. 5 shows a flow chart of the power generation cut control of the alternator 8 at start up and acceleration of the vehicle. Program starts in step 202. Transmission 4 is in a drive range changed from a neutral range, and there is no electric load, and the battery voltage is at normal level (step 204), and then the vehicle starts running (step 206). If it is detected that the gear is shifted from low speed to second speed (step 208), then the cut control for the power generation of the alternator 8 starts (Power generation is prevented) with CD at 0%. Also measurement of a limit value A (power generation cut time) starts, and totalizing of a limit value B (power, integral of the current consumed by an electric load, as detected by the current sensor 24) starts (step 210). Then it is determined at step 212 whether or not the limit value A is exceeded.

If the determination at step 212 is "YES", then the alternator 8 is to be returned for power generation. The alternator 8 does not gradually generate power when the engine speed is above NE1, but gradually generates when the engine speed is below NE1 (step 214).

If the determination at step 212 is "NO", then it is determined at step 216 whether the limit value B is exceeded. The limit value B is set at C1 (Ah) under no load, but at C2 (Ah) under light load (C1 being greater or equal to C2). This is because remaining charge of the battery depends on the loads.

If the determination at step 216 is "YES", the alternator 8 returns to generate power (step 218). If the determination at step 216 is "NO", then another determination is made at step 220 whether the engine speed exceeds NE2 (>NE1) or the vehicle speed exceeds V2 (While the engine speed is faster than NE1). If the determination in step 220 is "NO", the program returns to previous step 212.

If the determination at step 220 is "YES", the alternator 8 returns to generate power (The alternator 8 does not generate power gradually, since the engine speed is faster than NE1) (step 222).

Figure 6:
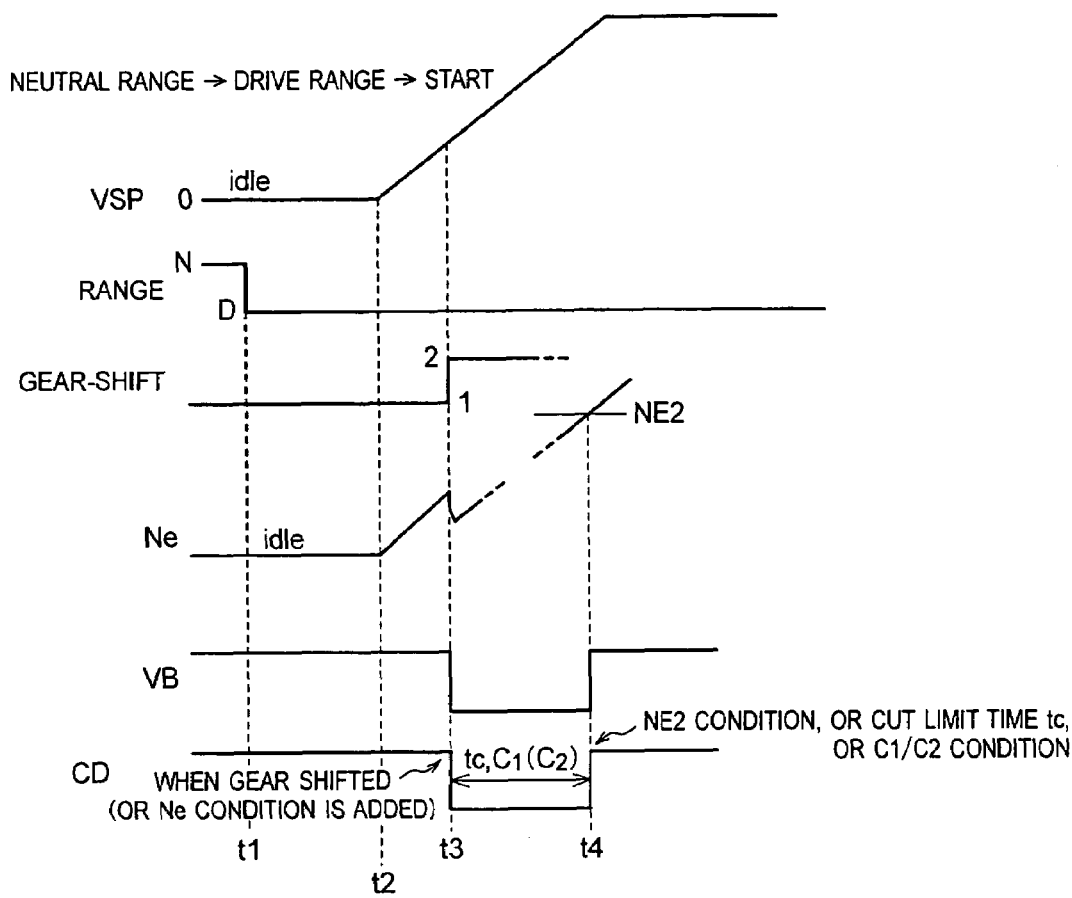
FIG. 6 is a timing chart of power generation cut control of the alternator at start and acceleration of the vehicle according to the first embodiment.

FIG. 6 shows a timing chart of the power generation cut control of the alternator 8 at start and acceleration of the vehicle. Time t1 is a time when the engine 2 is in idle speed operation and the vehicle speed VSP is at zero and the vehicle starts by shifting from the neutral to the drive range. At time t2 when a certain time has elapsed from t1, the engine speed and the vehicle speed VSP gradually increase. Time t3 is a time when a condition of gear-change or a condition of the engine speed is satisfied after a certain period has elapsed from time t2. At time t3, the battery voltage VB and CD decrease (Power generation is prevented). After a certain period has elapsed from time t3, the engine speed increases to NE2, and a condition of the engine speed at NE2, a condition of a power generation limit time tc, or a condition of C1/C2 is satisfied (time t4), the battery voltage VB and CD return to previous values.

Figure 7:
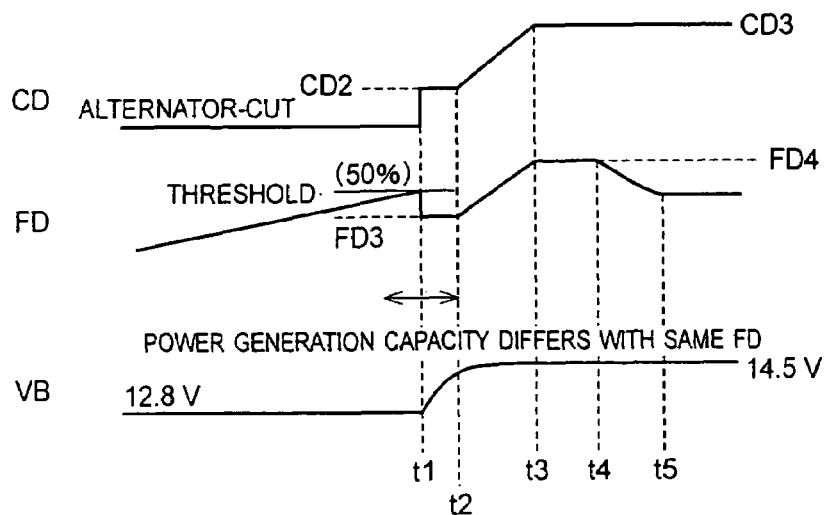
FIG. 7 is a timing chart of power generation cut control of the alternator in an idle operation of the engine according to the first embodiment.

FIG. 7 shows a timing chart of the power generation cut control of the alternator 8 while the engine 2 is in idling operation. While CD is at 0% and the battery voltage VB is at 12.8-volts, time t1 is a time when FD gradually increases to a threshold value (50%). At this time t1, CD increases to a certain value CD2, and FD decreases to FD3, and the battery voltage VB gradually increases. At time t2 after a certain period has elapsed from time t1, FD and CD start to gradually increase. At time t3 after a certain period has elapsed from time t2, FD is at FD4 and CD is at CD3, and the battery voltage is at 14.5-volts. At time t4 after a certain period has elapsed from time t3, FD gradually decreases to a value corresponding to the electric load used while the battery charge is finished.

Figure 8:
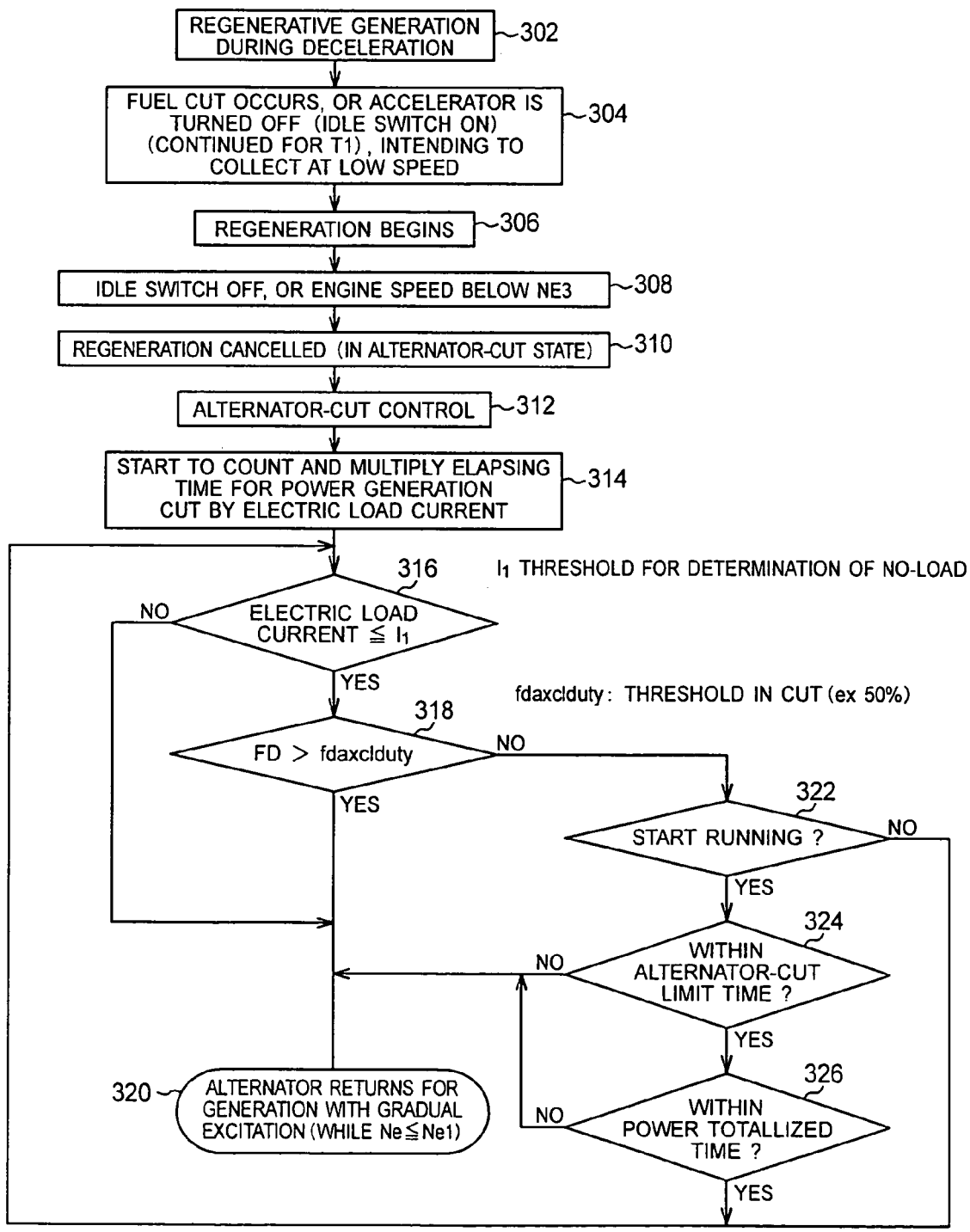
FIG. 8 is a flowchart of power generation cut control of the alternator, following regenerative generation according to the first embodiment.

FIG. 8 shows the regenerative generation control during deceleration of the vehicle and the subsequent power generation cut control of the alternator 8. After the program starts at step 302, the fuel supply to the internal combustion engine 2 is prevented (Fuel cut control is performed as in a hybrid vehicle), or the accelerator switch 30 is deactivated, i.e., the idle switch 28 is activated for period T1, intending to collect the power at low speed (step 304). Regenerative generation is then started (step 306). Idle switch 28 is deactivated or the engine speed decreases below NE3 (step 308). Regenerative generation is then canceled (the alternator 8 is in the power generation cut state) (step 310). Power generation of the alternator 8 is stopped (power generation cut) (step 312). Measurement and integration of elapsing time of the power generation cut and the load current value of electric load detected by the current sensor 24 start (step 314).

Then it is determined at step 316 whether the electric load current value detected by the current sensor 24 is less than or equal to I1 (threshold to determine whether there is no-load). If the determination at step 316 is "YES", then another determination is made at step 318 whether FD is greater than "fdaxclduty" (threshold during power generation cut is executed; e.g. 50%). If the determination at step 318 is "YES", the alternator 8 starts the gradual power generation (gradual excitation control) (As long as Ne is less than or equal to Ne1) (step 320).

If the determination at step 316 is "NO", the program goes to step 320 and the alternator 8 starts the gradual power generation (As long as Ne is less than or equal to Ne1).

If the determination at step 318 is "NO", it is determined at step 322 whether the vehicle starts running again. If the determination at step 322 is "YES", it is determined at step 324 whether the elapsing time of the power generation cut is within a power generation cut limit time. If the determination at step 324 is "YES", a determination is made at step 326 whether it is within a power integral time. If the determination at step 326 or the determination at step 324 is "NO", the program goes to step 320 and the alternator 8 is returned to start the gradual power generation (Ne is less than or equal to Ne1).

If the determination at step 322 is "NO" or the determination at step 326 is "YES", then the program returns to step 316.

Figure 9:
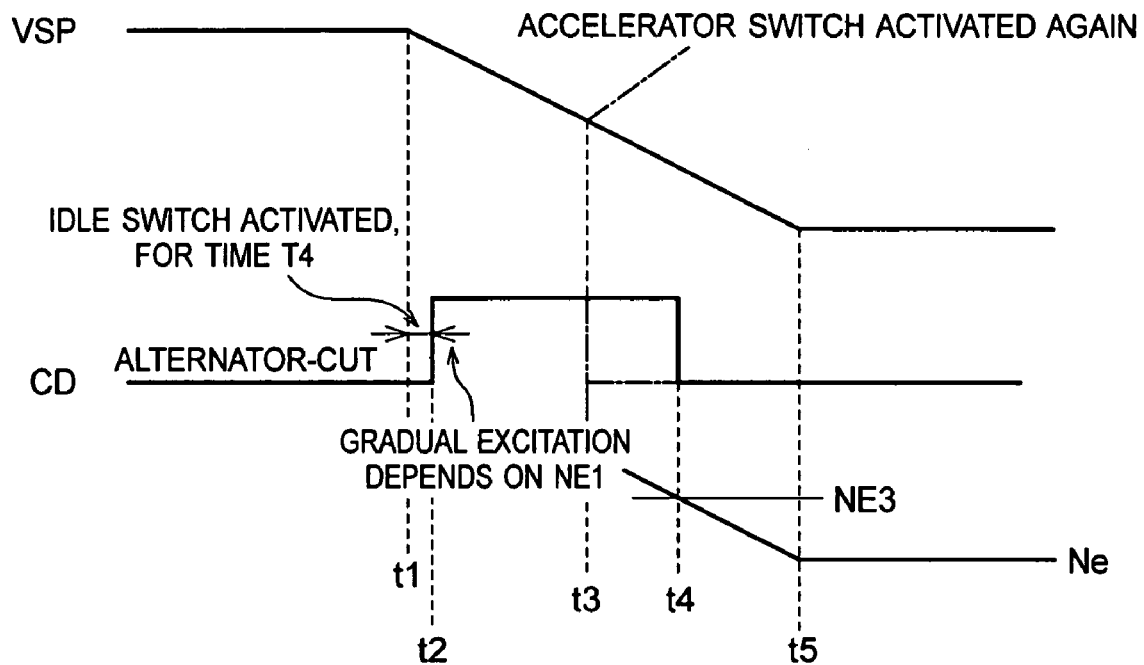
FIG. 9 is a timing chart of power generation cut control of the alternator, following regenerative generation according to the first embodiment.

FIG. 9 shows a timing chart of regenerative generation control during deceleration of the vehicle and the subsequent power generation cut control of the alternator 8. Power generation of the alternator 8 is prevented until time t2, that is when a certain time T4 has elapsed from time t1 at which the vehicle speed VSP decreases and the idle switch 28 is activated. At this time t2, CD increases, and whether or not the gradual power generation is executed is determined from the engine speed NE1. At time t3 after a certain period has elapsed from time t2, the accelerator switch 30 is activated again. At time t4 after a certain period has elapsed from time t3, the engine speed decreases to NE3 and CD decreases and the power generation by the alternator is prevented. At time t5 after a certain period has elapsed from time t4, the engine speed Ne is at a constant speed and the vehicle speed VSP is also at a constant speed.

Figure 10:
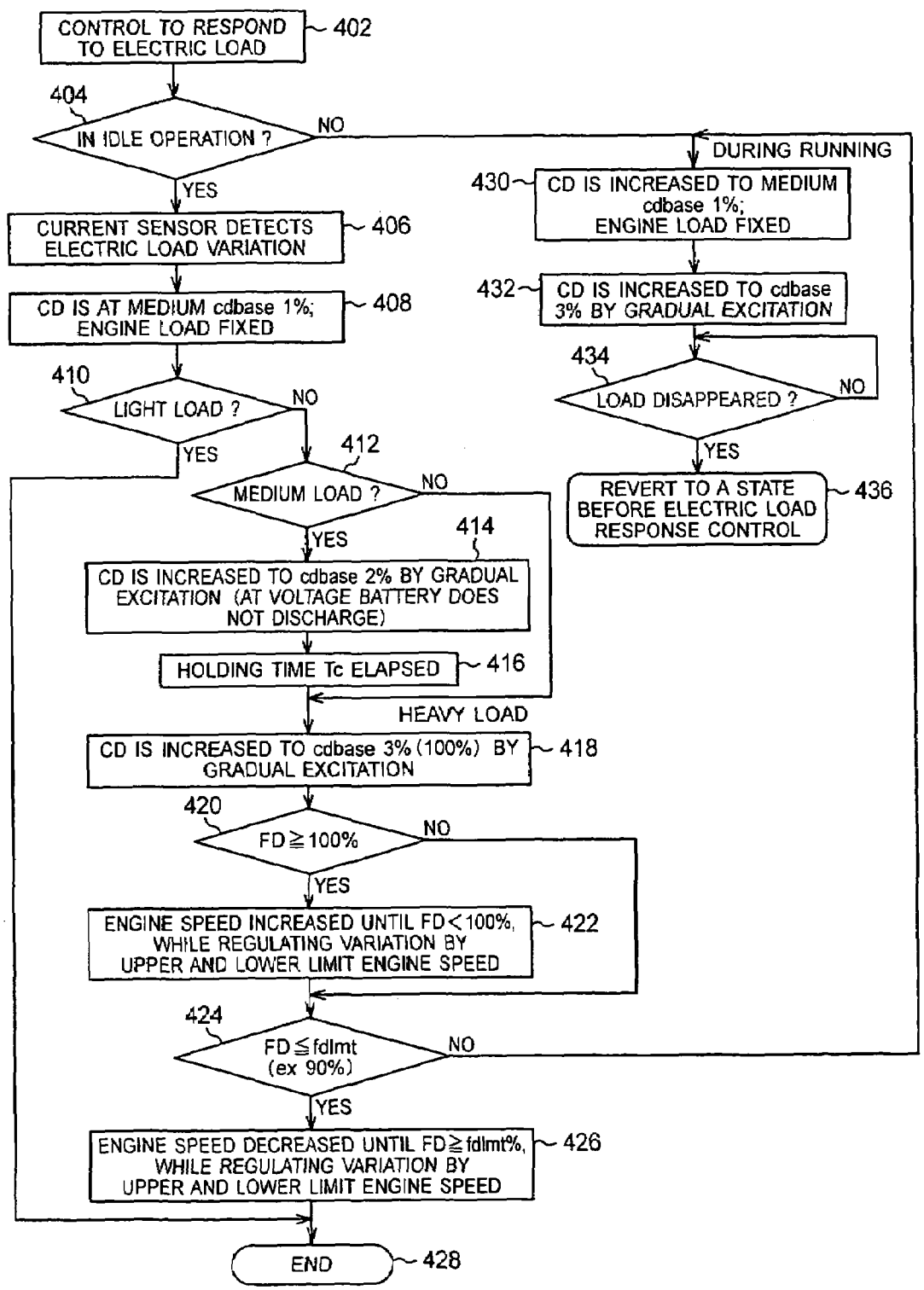
FIG. 10 is a flowchart of electric load response control according to the first embodiment.

FIG. 10 shows a flowchart for a control for response to the electric load. The program starts at step 402. It is determined at step 404 whether the engine is in idle driving operation. If the determination at step 404 is "YES", the current sensor 24 detects the variation of the electric load (step 406), CD increases to a medium value "cdbase" 1% to settle the engine load (step 408). It is determined at step 410 whether the electric load is light.

If the determination at step 410 is "NO", then another determination is made at step 412 whether the electric load is a medium load. If the determination at step 412 is "YES", CD increases to "cdbase" 2% by gradual excitation to be at a controlled voltage where the battery 6 does not discharge (step 414). After a holding time Tc has elapsed (step 416), CD increases to "cdbase" 3% (100%) by the gradual excitation (step 418). If the determination at step 412 is "NO", the program goes to step 418.

Then it is determined at step 420 whether FD is at or above 100%. If the determination at step 420 is "YES", the engine 2 is increased (idle-up control) until FD is less than 100%. However, upper and lower limit values for the engine speed are provided to regulate the variation (step 422).

Then it is determined at step 424 whether FD is less than or equal to "fdlmt" (e.g. 90%). If the determination at step 420 is "NO", the program goes to step 430. If the determination at step 424 is "YES", the engine speed during idle operation is decreased until FD is at or above "fdlmt" %. However, upper and lower limit values for the engine speed are provided to regulate the variation (step 426), and the program ends (step 428).

If the determination at step 410 is "YES", then the program ends immediately (step 428).

If the determination at step 404 or the determination in step 424 is "NO", that is when the vehicle is running, so that CD is set at a medium value "cdbase" 1% to stabilize the engine load (step 430). Then CD increases to "cdbase" 3% by gradual excitation (step 432). It is determined at step 434 whether there is no electric load. If the determination at step 434 is "NO", this determination is repeated. If the determination at step 434 is "YES", the control is reverted to a state before the control of the electric load response is performed (step 436).

In this first embodiment, at engine startup, the power generation by the alternator 8 is prevented generally if the power generation cut control is executed in consideration of the engine load. That is, in the first embodiment, the gradual power generation can be executed by the controller 20, not by a conventional regulator circuit. For example, CD is set to zero % (the alternator 8 is prevented from generating power), and then CD is increased for each predetermined time, so that the time for gradual excitation or the rate thereof can be changed freely.

Figure 11:
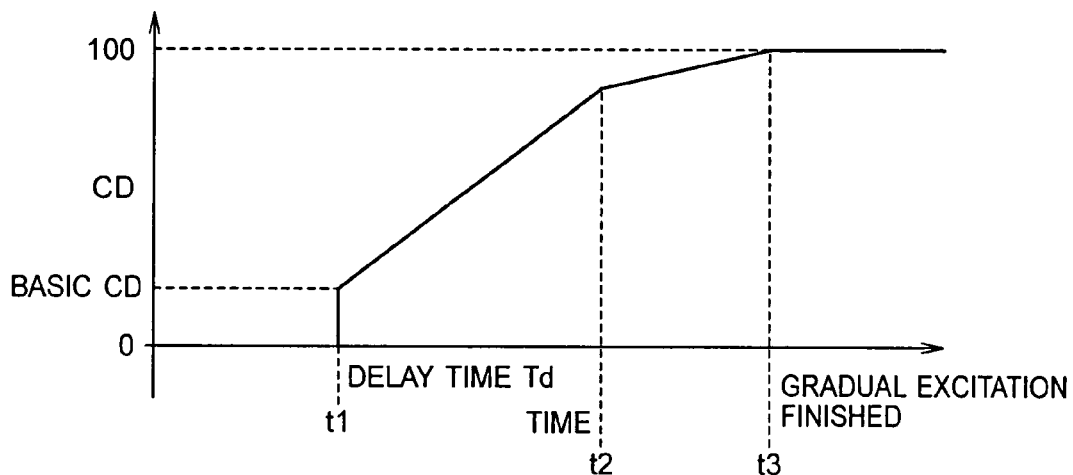
FIG. 11 is a timing chart of application to power generation cut control of the alternator at engine startup according to the first embodiment.

FIG. 11 shows an application of the first embodiment. After the gradual excitation is ordered and at a delay time Td (at time t1), CD is increased to a basic CD and the gradual excitation starts. Ratio of CD increase varies in stages until time t2 and then gradually increases to 100% and gradual excitation finishes at time t3. The delay time Td is intended to prevent malfunction owing to disturbances such as noise. The basic CD (terminal duty signal value) is provided to skip a CD range where the load variation is small.

When the transmission is in parking, neutral, or reverse range, the alternator 8 is generally activated (CD is at 100%) to cover the current consumed at least by the starter 22 at subsequent engine startup.

Further, at the start of the vehicle with the transmission shifted from neutral to drive range, the alternator 8 is activated but there is no electric load. However, the electric power required to control the engine 2 passes. Determination of presence of the electric load is made with the threshold of the current sensor 24. Thereby, the light loads such as small lamps are below the threshold.

After the battery 6 is confirmed to be in a normal voltage range, the vehicle starts running. The alternator 8 is prevented from power generating (power generation cut; CD is at zero %) when the gear is shifted from first to second speed. The battery starts to discharge, so that a quantity of electricity is calculated from multiplying the elapsing time of power generation cut by the load electric value detected by the current sensor 24.

Also, during continuous driving of the vehicle, the alternator returns to generate power when the time for the power generation cut is over. Whether the alternator 8 returns to generate power gradually or not depends on the engine speed. It is the light loads which are determined by the quantity of electricity, and the alternator 8 is set to return to generate power sooner than the power generation cut time during the continuous running of the vehicle.

The power generation cut of the alternator 8 is canceled when the vehicle speed is increased over a certain speed or when the engine speed is at a certain speed. For the vehicle with a manual transmission (MT), the engine speed with a partially engaged clutch may exceed this limit speed, so that it is required to use only the vehicle speed to determine the cancelling of a power generation cut.

During deceleration of the vehicle, the fuel cut control is executed. The power generation cut of the alternator 8 is also executed when the idle switch 28 is deactivated again (start depressing of the accelerator pedal), or when the engine speed is below a certain speed.

When the engine 2 returns to the idle operating state, the power generation of the alternator 8 is prevented. Until the alternator 8 returns to generate power, counting of elapsing time of the power generation cut and the current totalization are continued. A charge state of the battery is detected by field current duty value FD. However, it is required that there is no load (the current detected by the current sensor 24 is below the threshold). If FD satisfies a return condition (e.g., 50%), the alternator 8 returns to generate power under the control of gradual excitation.

Then the vehicle runs again, and power generation cut control is determined from elapsing time of the power generation cut and the totalized time, since determination of field current duty value FD is not achievable.

Figure 12:
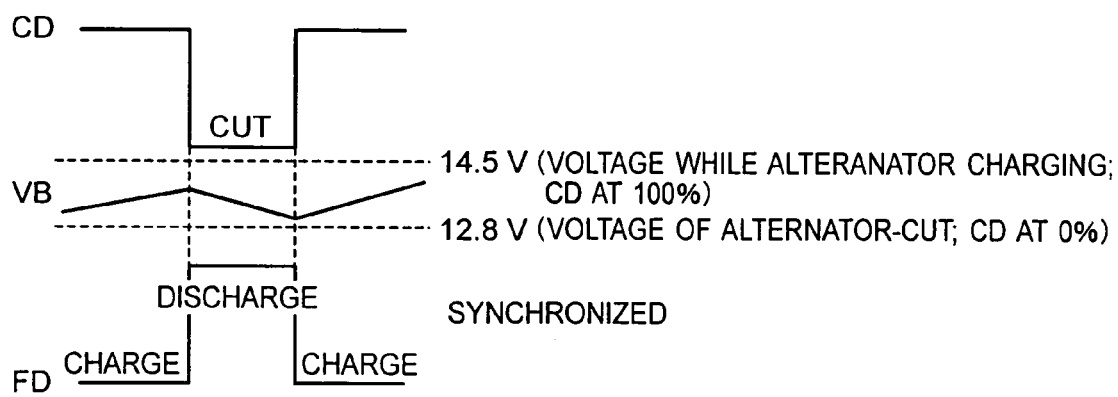
FIG. 12 is a timing chart showing changes in battery voltage in synchronization with discharge of FD according to the first embodiment.
Figure 13:
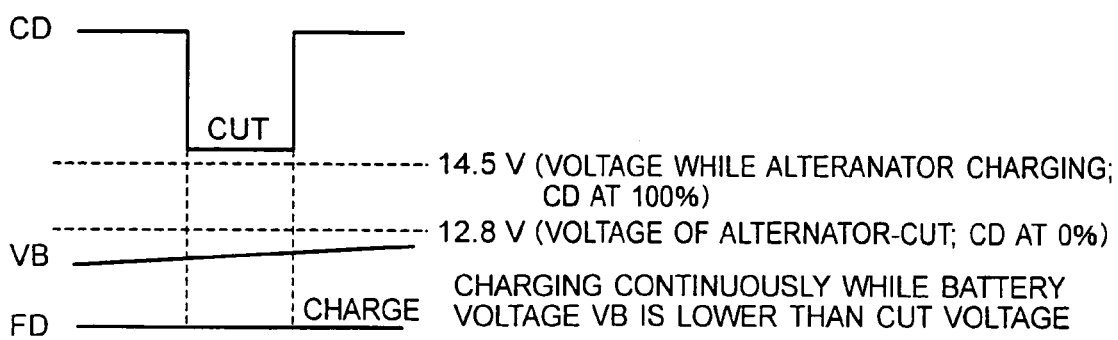
FIG. 13 is a timing chart when FD is continuously discharging and the battery voltage is lower than a voltage for the power generation cut according to the first embodiment.
Figure 14:
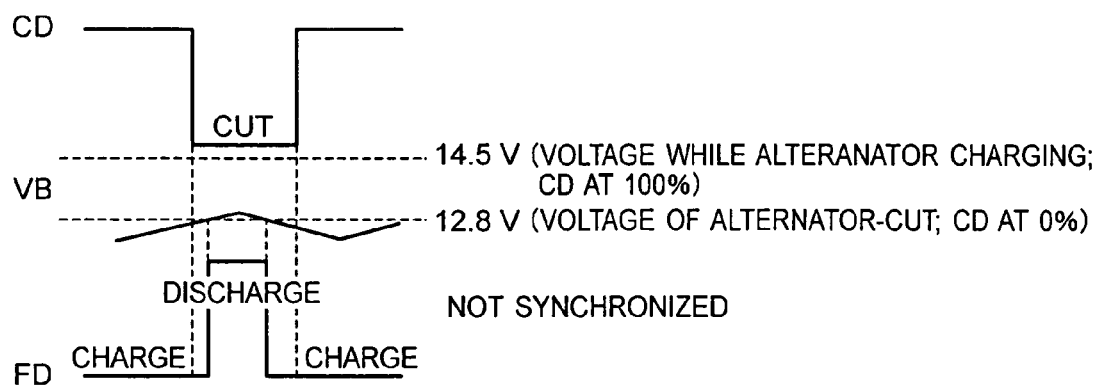
FIG. 14 is a timing chart showing changes in battery voltage not in synchronization with discharge of FD according to the first embodiment.

Further, in the electric load response control, when the electric load occurs, the engine speed may decrease or result in hunting or other hazards, due to an inrushing current. This is due to the alternator 8 responding directly to the electric load, which relates to the engine load. To avoid this, the reference duty value CD is set at the medium value (50%), and the battery voltage is maintained so as to not decrease below the voltage for power generation cut, thereby CD and FD are synchronized. More particularly, as shown in FIG. 12, the battery voltage VB is changed between 12.8-volts and 14.5-volts in synchronization with the discharge of FD. As shown in FIG. 13, the battery voltage VB is lower than a cut voltage (12.8-volts) while the field duty value FD is continuously charging. As shown in FIG. 14, the battery voltage VB is just a little above 12.8-volts when CD is not synchronized with the discharge of FD.

That is, the power generation control system of this first embodiment controls reference duty value CD, and does not control such that FR itself is oscillated resulting in bad controllability or lamp flicker due to resonance of CD and FD. As mentioned above, frequency of FD is not identified when CD is at 0%, or the controller does not receive duty as it is, so that conversion into analogue or a ratio between ON and OFF is utilized for control. Control according to a condition of running or the amount of electric load is described below.

In a control #1 at idle (heavy load), occurrence of the electric load is determined by a threshold of the current sensor 24 (threshold for heavy load). CD is set at the medium value (electric load basic CD; e.g., 50%). Engine load is fixed. CD returns to 100% by the gradual excitation, thereby the field current duty signal value FD is determined. When the field current duty signal value FD is at 100%, the engine speed at idle is increased (by the idle speed control to increase intake air quantity) until FD is below 100%. Then the battery 6 is charged. When the electric load decreases and FD is below a certain predetermined value (e.g. 90%), the engine speed decreases until FD is above the certain value.

In a control #2 at idle (medium load), occurrence of the electric load is determined by a threshold of the current sensor 24 (threshold for medium load). The terminal duty signal value CD is set at the medium value (electric load basic CD; e.g., 50%). CD is controlled by the gradual excitation such that the voltage is at a certain value. At this voltage, the battery 6 is in a charged state or without any input/output. Engine load is fixed. Further, even when the electric load occurs, the stability of the engine 2 for idle driving is maintained, since the load of the alternator 8 is fixed. The terminal duty value CD is regulated, since the battery 6 discharges and only the voltage varies. Holding time Tc is provided, and after this holding time Tc, terminal duty signal value CD is at 100% and the field duty signal value FD is determined.

In a control #3 during running of the vehicle, occurrence of the electric load is determined by a threshold of the current sensor 24. The terminal duty signal value CD is set at the medium value (electric load basic CD; e.g., 50%). CD is returned to 100% by gradual excitation. If an electric load occurs and the alternator 8 is prevented from power generation, the alternator 8 is returned to a state of power generation cut upon disappearance of the electric load.

In a control #4, when a hazard indicator or a blinker is being used, operation of the hazard and blinker is identified. (Hazard indicators repeatedly are continuously activated and deactivated, which may result in hunting of the engine speed). The operation of the hazard indicator and blinker is identified when the current being repeatedly activated and deactivated in a certain period is detected. The terminal duty signal value CD is set at the medium value (electric load basic CD; e.g., 50%). CD is controlled by gradual excitation such that the voltage is at a certain value. At this voltage, the battery is in a charged state. Engine load is fixed. Limit time Tw is provided and CD returns to 100% after the limit time Tw passes. Idle engine speed is increased and the engine load decreases to prevent the hunting, and the battery 6 is charged. After the hazard indicator or the blinker is deactivated, even if the load of the hazard indicator or the blinker occurs again in a certain period, this control is not performed. As thus described, in the electric load response control, the terminal duty signal value CD is set at the medium value (e.g., 50%). CD is not limited to this value. Control voltage set within a limit voltage (between 12.8-volts and 14.5-volts) may be applied. For example, value of 20–80% can be applied to CD.

As a result, according to this embodiment, the output of the alternator 8, AC generator, is controlled based on the detected states of the battery and the electric loads. This does not affect life of the battery, and the power generation cut control can be executed to the maximum, and the fuel economy is improved.

More particularly, in the control of the terminal C duty signal value (CD), by setting the selected battery voltage, CD varies the output current of the alternator and the battery 6 can be controlled during from the charge to discharge states. Also, since CD is controlled to be set at the medium value, the output of the alternator 8 is regulated to avoid variation in the engine speed by the electric load. Further, since gradual excitation is performed by the controller 20, any pattern for gradual excitation and any time for gradual excitation can be set, so that the time for gradual excitation can be shortened in accordance with the idle speed control, which improves control of the engine 2.

Also, in the field current (FD) monitor, condition of the electric loads including the battery 6 can be determined while the alternator 8 is prevented from power generation.

Safe depth of discharge for the battery 6 can be set, which results in effective utilizing of the regenerative power generation. During power generation, an excessive load by the alternator 8 can be determined, so that the battery can be protected by increasing idle speed.

Further, in the monitoring of the electric load by the current sensor 24, an EL switch in heavy load components (air conditioner, lights, defrost devices) can be eliminated. It can be applied when total current of electrical elements of the small electric loads system is large. It can also be applied to heavy load components without the EL switch (current of power window lock) and additional components that are user mounted.

In the power generation cut control during acceleration of the vehicle, the alternator 8 does not impose a load at the start of the vehicle operation, thereby improving driver's feeling toward acceleration and fuel economy by the power generation cut of the alternator 8.

In the regenerative charge control during deceleration of the vehicle, the battery 6 is in the discharge state by the power generation cut control during acceleration of the vehicle so as to improve receiving of the current from deceleration energy. Thus energy can be saved by decreasing the vehicle speed and frequency of depressing the brake.

In the electric load response control, the battery 6 supplements the variation in the electric load by the terminal duty value CD at the medium value to stabilize the engine speed. The hunting of the engine speed due to the hazard indicator or the blinker can also be prevented.

During acceleration of the vehicle, the controller 20 controls the alternator 8 to perform the power generation cut by the output control section 20E when the gear of the transmission 4 in connection with the engine 2 is shifted from first to second speed and when the electric load current value detected by the current sensor 24 is smaller than the predetermined value. Thereby, the power generation of the alternator can be prevented during acceleration of the vehicle, which improves a driver's feeling toward acceleration and reduces fuel consumption.

During deceleration of the vehicle, the controller 20 starts the power generation cut of the alternator 8 by the output control section 20E simultaneously with the fuel cut control of the internal combustion engine 2. Since the battery 6 is in the discharge state, the battery can accept the current during deceleration of the vehicle, and is therefore maintained in a preferable state at all times.

When the current sensor 24 detects that the electric load of the vehicle occurs, the controller 20 sets the external input duty value signal to the alternator 8 at 50%. In inputting the electric load signal, since the external input duty signal CD is set at 50%, the battery 6 can cover the voltage variation at input. This stabilizes the engine speed and prevents the hunting of the engine speed due to the intermittent operation of the hazard indicator or the blinker.

Figure 15:
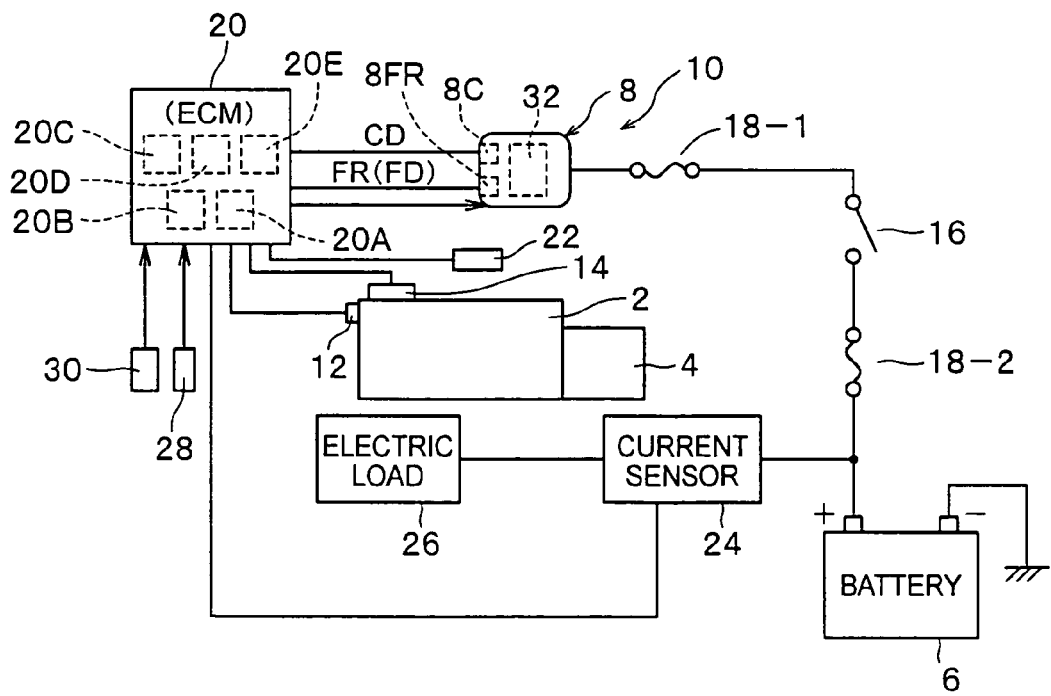
FIG. 15 is diagram of a modification of the power generation controller according to the first embodiment.

FIG. 15 shows a variation of the first embodiment. The problem encountered when the controller 20 directly controls FD while CD is at zero % is overcome by adding the following element to the regulator circuit 32.

That is, the power generation cut signal is produced from the regulator circuit 32 to generate the duty cycle. Regulator circuit 32 shifts to self-operation when it is detected that CD is at 0% for a predetermined time. CD control is returned to control of activation/deactivation of the C terminal and the controller 20 directly controls FR. Regulator circuit 32 shifts to self-operation so that the regulator circuit 32 generates the duty cycle when the C terminal duty signal (cut signal) is received. FR is provided for input and output, and the controller 20 can shift between input and output in accordance with the C terminal duty signal.

FIGS. 16–21 illustrate a second embodiment of the present invention.

In this second embodiment, the same functional parts are designated by the same reference numerals with respect to the first embodiment.

Figure 16:
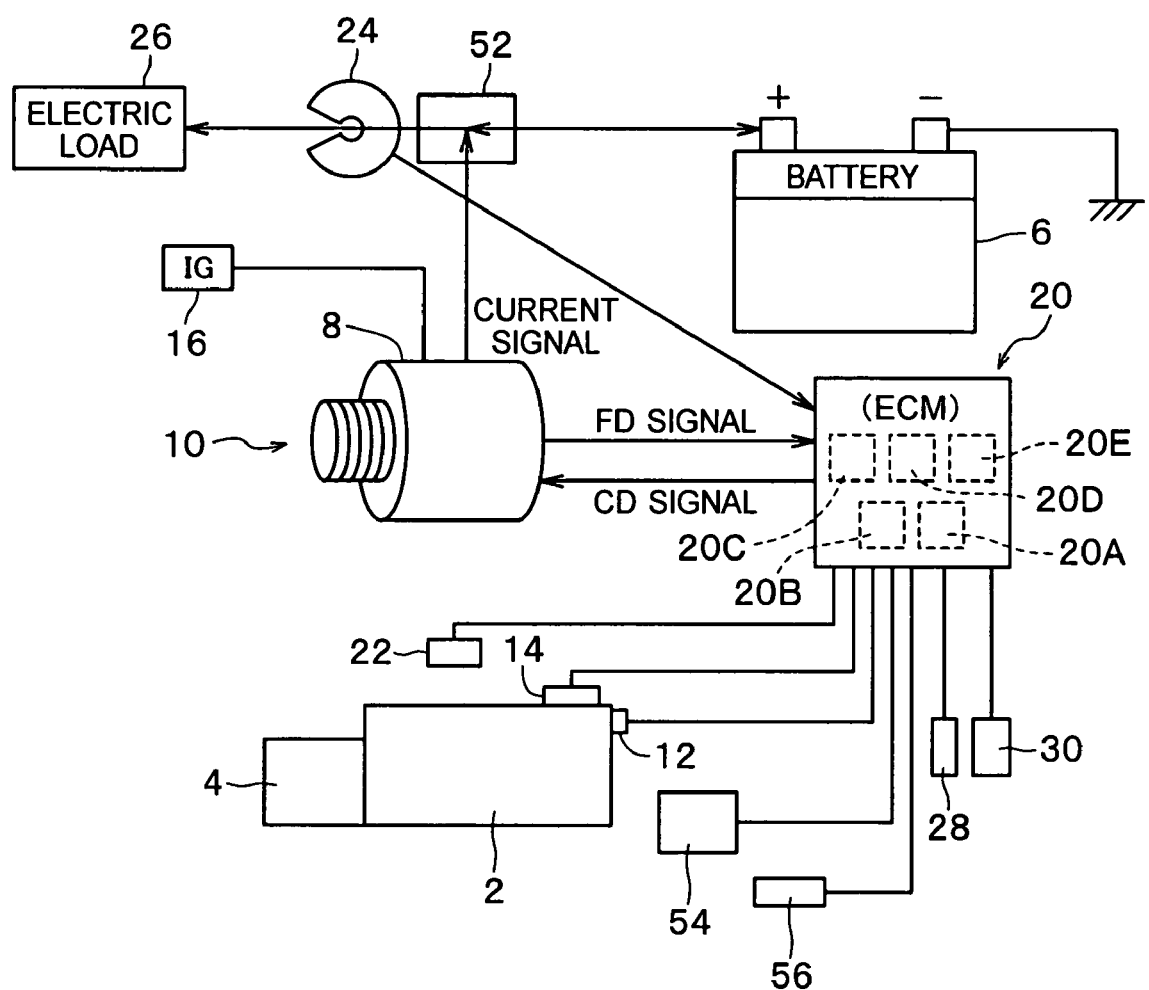
FIG. 16 is a diagram showing a system for a power generation controller according to a second embodiment.

The second embodiment is characterized as follows. As shown in FIG. 16, a fuse box 52 is disposed between the current sensor 24 and the battery 6. The alternator 8 is connected to the fuse box 52 and the ignition switch 16. The controller 20 is connected to a radiator fan 54 and an EL switch 56.

Operation of this second embodiment is described below.

Figure 17:
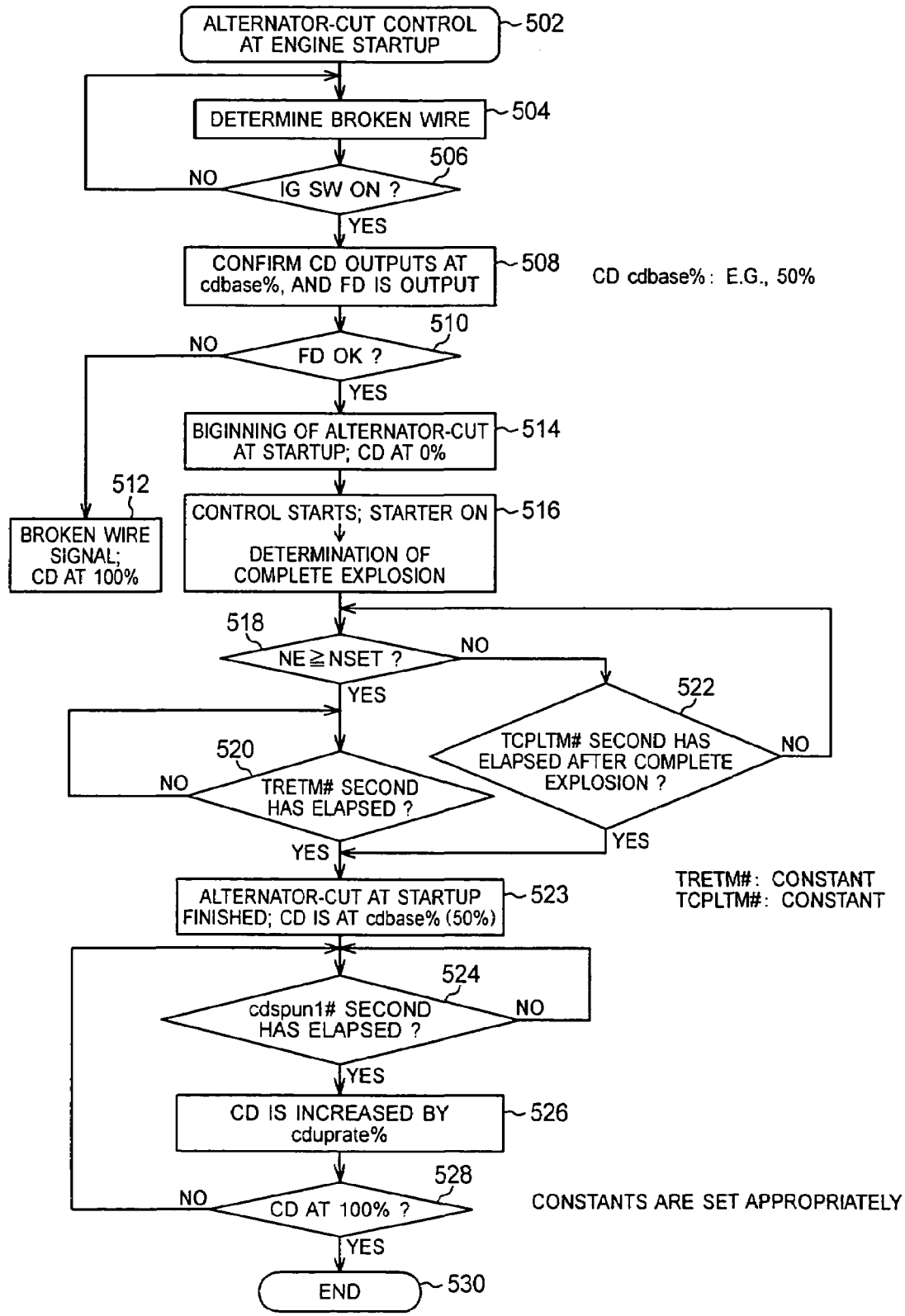
FIG. 17 is a flowchart of power generation cut control of the alternator at engine startup according to the second embodiment.

Referring to FIG. 17, another program for the cut control of the power generation by the alternator 8 at engine startup starts at step 502. Whether there is a broken wire is determined (step 504). Then a determination is made at step 506 whether or not the ignition switch 16 is activated (IG SW ON). If the determination at step 506 is "NO", the program returns to the previous step 504. If the determination at step 506 is "YES", then CD signals are output at "cdbase %", e.g., 50% and the FD signal is output (step 508).

Also, it is determined at step 510 whether or not this FD signal is OK. If the determination at step 510 is "NO", CD signal is set at 100% as a broken wire signal (step 512).

If the determination at step 510 is "YES", the power generation cut of the alternator 8 at the start of the engine 2 is started, and CD is set at 0% (step 514). Then the starter 22 is activated and it is determined at step 516 whether or not there is a complete starting of the engine 2.

Then it is determined at step 518 whether NE (engine speed) is at or above NSET (target engine speed; 2,000 rpm). If the determination at step 518 is "YES", then another determination is made at step 520 whether a predetermined time (TRETM# second) has elapsed. If the determination at step 520 is "NO", this determination is repeated.

If the determination at step 518 is "NO", then another determination is made at step 522 whether a predetermined time (TCPLTM# second) has elapsed from the complete explosion or starting of the engine 2. If the determination at step 522 is "NO", the program returns to the previous step 518.

If the determination at step 520 or 522 is "YES", then power generation cut of the alternator 8 at engine startup is completed, and CD is set at "cdbase % (50%)" (step 523).

Then it is determined in step 524 whether or not the time "cdspun1# second" has elapsed. If the determination at step 524 is "NO", this determination is repeated.

If the determination at step 524 is "YES", CD is increased by "cduprate" % (step 526). Then it is determined at step 528 whether CD is at 100%. If the determination at step 528 is "NO", the program returns to step 524. If the determination at step 528 is "YES", the program is finished (step 530).

Figure 18:
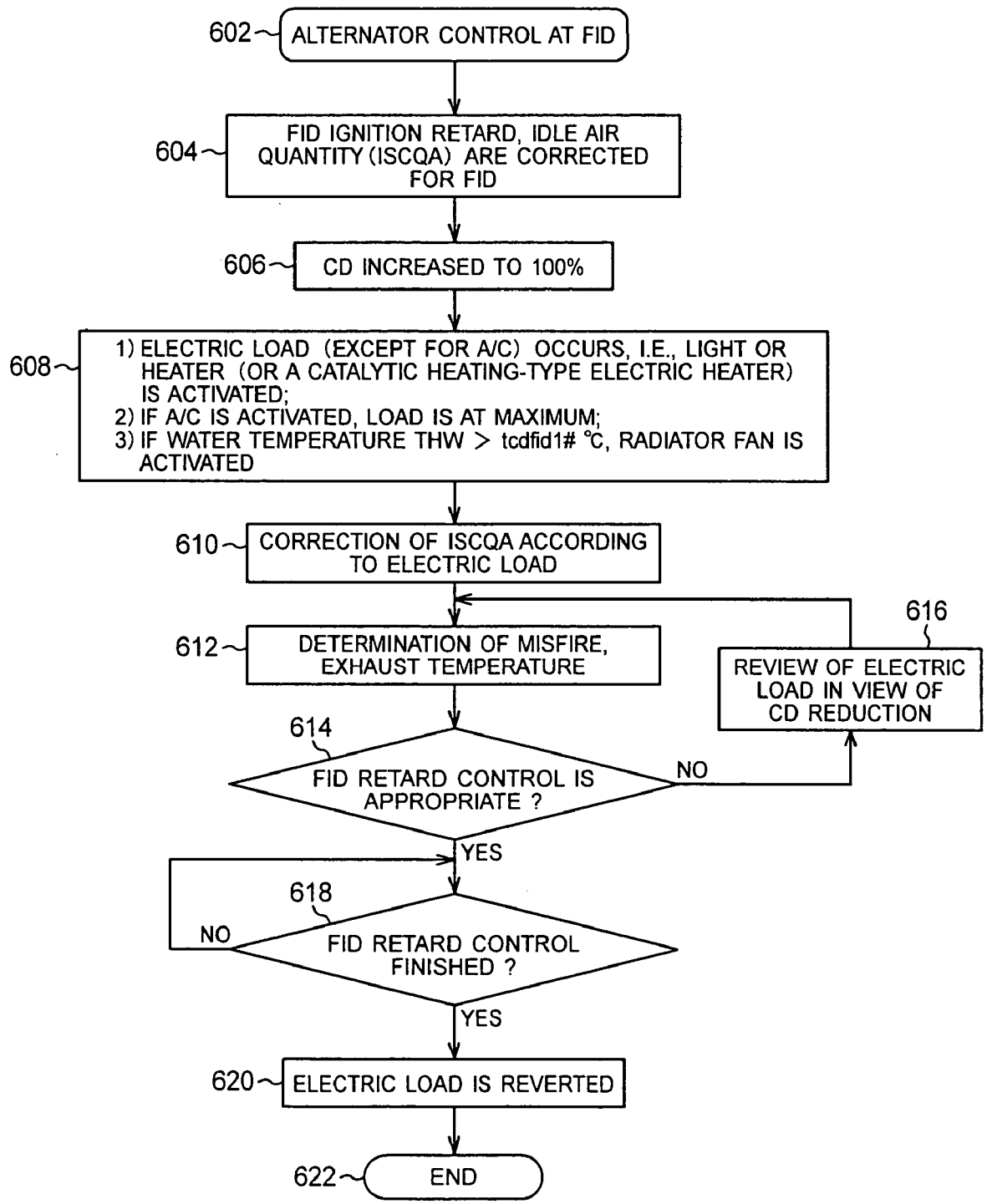
FIG. 18 is a flowchart of power generation cut control of the alternator at fast idle retard.

FIG. 18 shows a control at FID retard (fast idle retard). The program starts at step 602. FID ignition retard, quantity of air at idle (ISC air quantity; ISCQA) are corrected at step 604. Then CD is set at 100% (step 606).

At stop 608 the following events occur. The electric load (except for the air conditioner; A/C) occurs, i.e., the light or heater (or a catalytic heating-type electric heater) is activated. If the air conditioner is activated, then the load is at a maximum value. If coolant temperature THW is greater than "tcdfd1#" degree (centigrade), the radiator fan 54 is activated.

Then the idle air quantity (ISC air quantity) is corrected (step 610) for the electric load. Determinations of misfire in the engine and exhaust temperature are made at step 612. Then a determination is made at step 614 whether FID retard control is appropriate.

If the determination at step 614 is "NO", the electric load is reviewed by the decrease of CD (step 616) and the program returns to step 612. If the determination at step 614 is "YES", then a determination is made at step 618 whether the FID retard control ends. If the determination at step 618 is "NO", then this determination is repeated.

If the determination at step 618 is "YES", the electric load is returned to original load (step 620) and the program ends (step 622).

Figure 19:
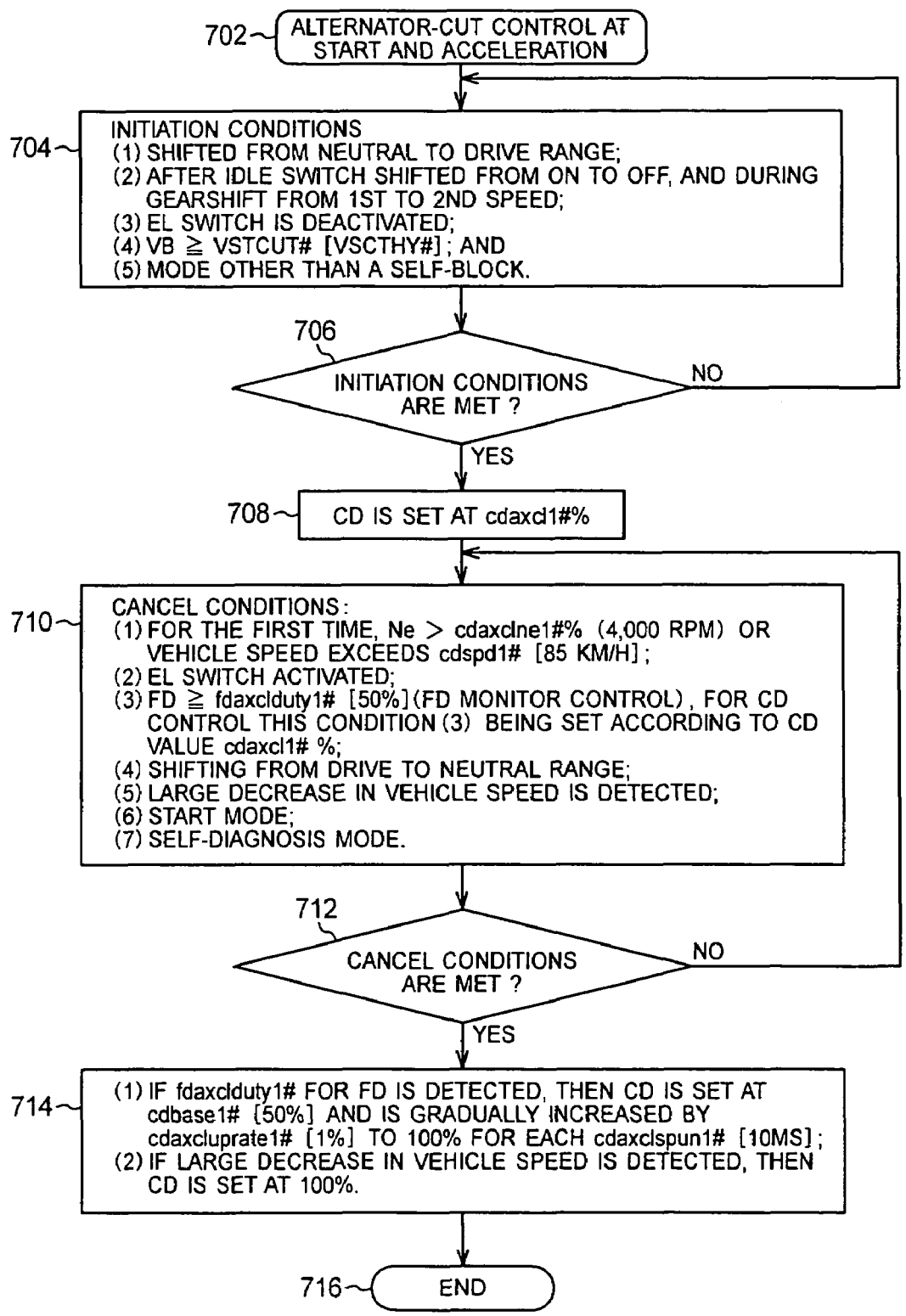
FIG. 19 is a flowchart of power generation cut control of the alternator at start and acceleration of the vehicle according to the second embodiment.

FIG. 19 shows the power generation cut of the alternator 8 at start and during acceleration of the vehicle. The program starts at step 702. As initial conditions, the following are input at step 704: (1) Shifted from neutral to drive range; (2) After the idle switch 28 is shifted from ON to OFF, and during gearshift from first to second speed; (3) The EL switch 56 is deactivated; (4) The battery voltage VB is greater than or equal to "VSTCUT#[VSCTHY#]"; and (5) Mode other than a self-block. Then it is determined at step 706 whether these initial conditions are satisfied. If the determination at step 706 is "NO", the program returns to previous step 704.

If the determination at step 706 is "YES", CD is set at "cdaxcl1#%" (step 708). As cancel conditions, the following are input at step 710: (1) For the first time, Ne exceeds cdaxclne1#% (4,000 rpm) or vehicle speed exceeds "cdspd1#"[85 km/h]; (2) The EL switch 56 is activated; (3) FD is greater than or equal to "fdaxclduty1#"[50%](FD monitor control), for CD control this condition (3) being set according to CD value "cdaxcl1#%"; (4) Shifting from drive to neutral range; (5) Large decrease in the vehicle speed is detected; (6) Start mode; and (7) Self-diagnosis mode. Then it is determined at step 712 whether these cancel conditions are satisfied. If the determination at step 712 is "NO", the program returns to step 710. Although at step 710, (3) for the FD control, FD is greater than or equal to "fdaxclduty1#"[50%], and (3) for CD control, CD equals to "cdaxcl1#" can also be used selectively.

If the determination at step 712 is "YES" and if (1) "fdaxclduty1# for FD" is detected, then CD is set at "cdbase1#"[50%] and is gradually increased by "cdaxcluprate1#"[1%] to 100% for each "cdaxclspun1#"[10 ms]. If the determination at step 712 is "YES" and if a large decrease in the vehicle speed is detected, then CD is set at 100% (step 714). Then the program ends (step 716).

Figure 20:
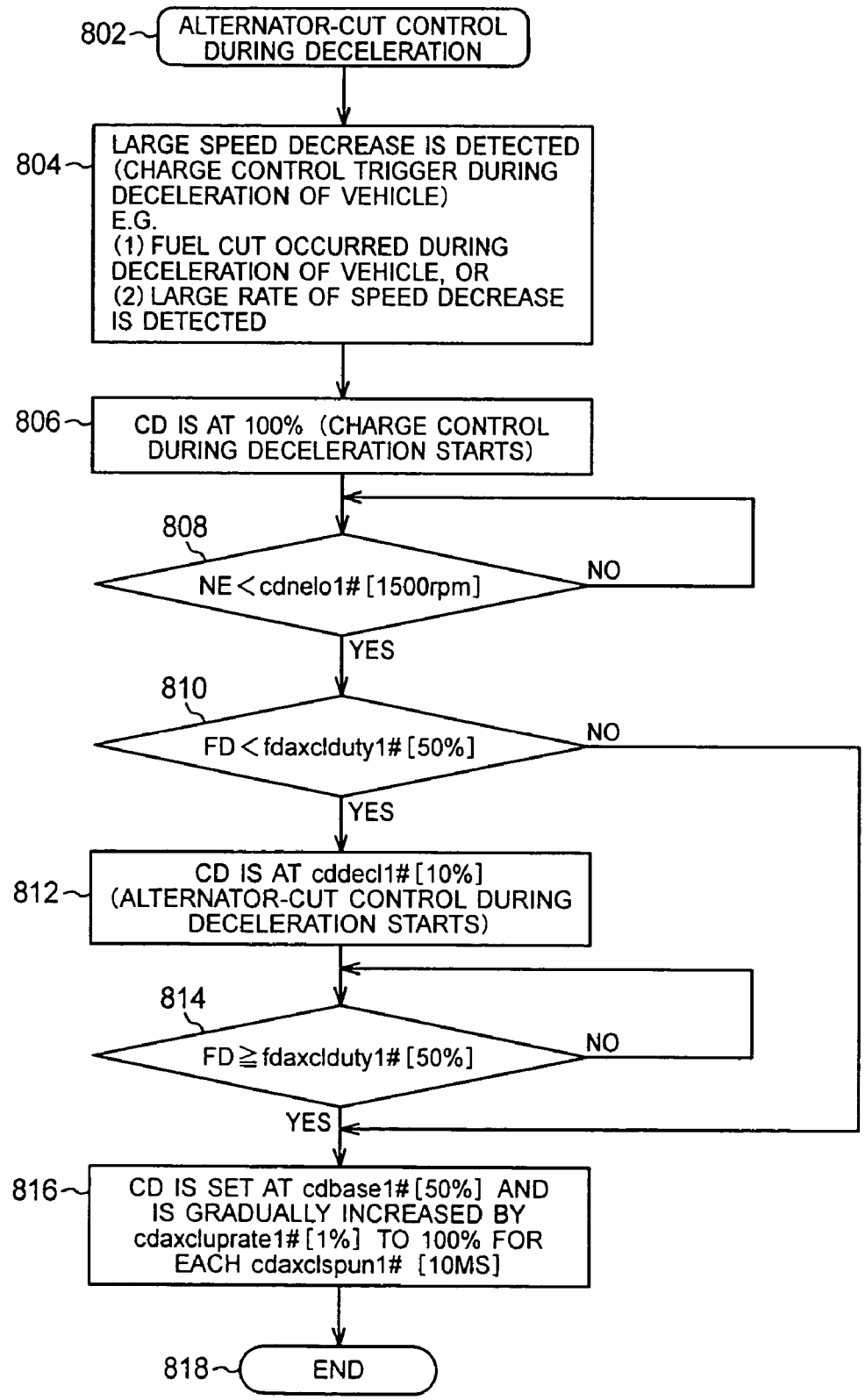
FIG. 20 is a flowchart of power generation cut control of the alternator during deceleration of the vehicle according to the second embodiment.

FIG. 20 shows the power generation cut of the alternator 8 during deceleration of the vehicle. The program starts at step 802. A large speed decrease is detected (trigger for charge control during deceleration of the vehicle). For example, (1) fuel cut occurred during deceleration of the vehicle, or (2) large rate of the speed decrease is detected (step 804). CD is set at 100%, i.e., the charge control during deceleration of the vehicle starts (step 806). It is determined at step 808 whether the engine speed NE is less than "cdnelo1#"[1,500 rpm]. If the determination at step 808 is "NO", this determination is repeated. At this step 808, an additional "OR" condition in which the accelerator switch 30 is activated again, can be inserted and returned to power generation cut of the alternator 8.

If the determination at step 808 is "YES", then another determination is made at step 810 whether FD is less than "fdaxclduty1#"[50%]. If the determination at step 810 is "YES", CD is set at "cddeol1#"[10%], and the power generation cut control of the alternator 8 during deceleration of the vehicle starts (step 812). A determination is made at step 814 whether FD is greater than or equal to "fdaxclduty1#"[50%]. If the determination at step 814 is "NO", this determination is repeated.

If the determination at step 814 is "YES" or the determination at step 810 is "NO", CD is set at "cdbase1#"[50%], and is gradually increased by "cdaxcluprate1#"[1%] to 100% for each "cdaxclspun1#"[10 ms] (step 816). Then the program ends (step 818).

Next, the power generation control according to the second embodiment is explained with reference to a timing chart in FIG. 21.

Figure 21:
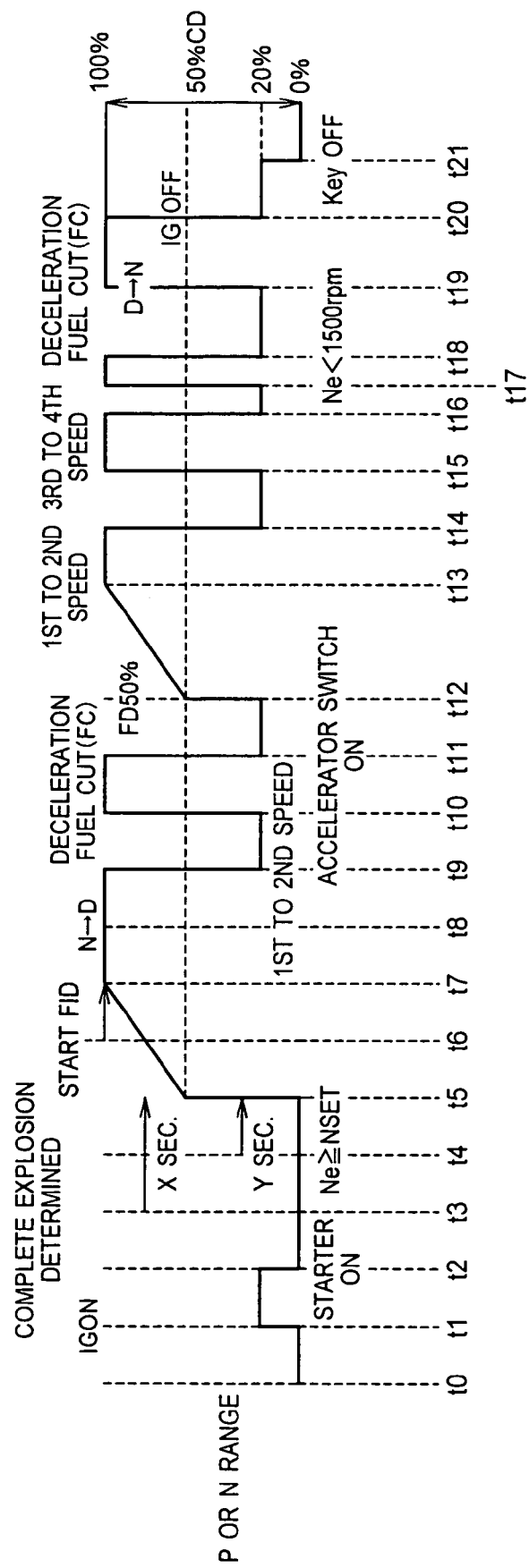
FIG. 21 is a timing chart of power generation control according to the second embodiment.

As shown in FIG. 21, when the ignition switch 16 is activated in parking or neutral range (time t1), CD increases from 0% to 20%. When the starter 22 is activated (IG ON) (time t2), CD decreases to 0%. At time t3 after X seconds has elapsed from the detection of the complete starting of the engine, or at time t4 after Y second has elapsed from which Ne is greater than or equal to NSET, CD increases to 50% (time t5). Then CD gradually increases, and the FID (fast idle retard) starts (time t6). CD reaches 100% (time t7), and then transmission is shifted from neutral to drive range (N to D range) (time t8). When the gear is shifted from first to second speed (time t9), CD decreases to 20%. When the fuel cut of the engine 2 is started (time t10), CD reaches 100%. When the accelerator switch 30 is activated (time t11), CD is at 20%. FD is at 50% (time t12) and CD is at 50%. Then CD gradually increases to 100% (time t13). When the gear is shifted from first to second speed (time t14), CD is at 20%. When the gear is shifted from third to fourth speed (time t15), CD is at 100%. Then CD is at 20% (time t16). When the fuel cut of the engine 2 during deceleration of the vehicle is performed again (time t17), CD reaches 100%. When the engine speed Ne is below 1,500 rpm, CD is at 20% (time t18). When the transmission is shifted from drive to neutral range (time t19), CD reaches 100%. When the ignition key 16 is deactivated (IG OFF) (time t20), CD is at 20%. When the engine key is deactivated (time t21), CD is at 0%.

Specifically, in this second embodiment for power generation cut of the alternator 8 at engine startup, CD is at 0% and FD is at 0%. Even under this condition, the electric power will somewhat be generated in relation to reference voltage of FD, so that the existing power generation cut at the start of the vehicle is still required (especially at a low temperature). If needed, it can be considered that the alternator 8 may be shunted by a relay (not shown) to establish a short circuit (Voltage does not rise). For a normal alternator 8 performing the terminal C duty (CD) control, it is difficult to perform the power generation cut at the start of the vehicle due to the possibility of resonance with the gradual excitation circuit. Sufficient discussion about frequency may be needed.

Under a no-load condition, the following control is performed.

At the FID (fast idle retard), idle air quantity (ISC air quantity) increases with increase of quantity of fast idle ignition retard. Thereafter, the idle air quantity cannot be increased anymore in the misfire range. Instead, by forcing to imposing load on the radiator fan 54 or the air conditioner (or the catalytic-heating electric heater), the idle air quantity can be increased.

In parking, neutral, or low range, the alternator 8 is activated constantly (Basic CD is at 100%). At least, the alternator 8 covers the power consumption of the starter 22. CD is set at a large value, but is regulated in accordance with the state of the battery.

At the start of the vehicle, while shifting from neutral to drive range, the alternator is still activated. Aside from the first speed in need of the torque, at the second speed or more, the alternator 8 is prevented from power generation in view of drivability. Whether the charge state is OK is determined from FD under the no-load condition. Under the no-load condition, the power supplied from the battery 6 is small in the mid speed range even as the power generation is prevented. FD is at the threshold (e.g. 50%), the alternator 8 returns to generate power by gradual excitation. If CD is set at 0% for power generation cut of the alternator 8, FD also remains at 0%. Therefore, it is required that CD is returned to a normal state after CD is increased at a certain value (approximately 20%) and FD increases with decrease of the battery voltage to the threshold.

During acceleration of the vehicle in a four-speed manual transmission, the power generation cut of the alternator 8 is canceled when shifted to fourth speed. At such engine speed, a shock that may occur in canceling the power generation cut of the alternator 8 is small.

During deceleration of the vehicle, CD is at 100% and FD varies according to the battery 6 and the loads. Power generation of the alternator 8 is prevented when the engine speed is at 1,500 rpm, turning into FD determination mode. Also, when the accelerator pedal is depressed again, the alternator 8 returns to the power generation cut.

During the stop of the vehicle, CD is at 0%, and when the ignition switch 16 is activated, several percent of duty wave is generated to check for a broken wire.

During idle operation of the engine 2, FD determination is performed to start power generation cut of the alternator 8.

When the radiator fan 54 is driven, the load of alternator 8 becomes large at idle driving and an inrush of current occurs, which may result in the hunting of the engine speed. The power generation cut is performed just for one or two seconds from the activation of the radiator fan 54, and after the battery voltage is recovered to some extent, the power generation cut is canceled by gradual excitation. When the electric load occurs, the alternator 8 is continuously activated mainly in consideration of the inrushing current.

During control by the gradual excitation, CD of the power generation cut of the alternator 8 (in a state of low-degree charging) is increased from e.g., 20% to CD basic value (e.g., 50%). The alternator 8 is activated (in a state of high-degree charging, e.g., CD at 100%) to gradually increase duty within a certain period (e.g., 2.5 seconds, 5 seconds, or the like).

With the determination of FD, the threshold for FD is provided at (1) a no-load state, at idle driving, and at the low-degree charging state so as to determine that the alternator 8 is returned from the power generation cut. (2) FD hardly changes on the circuit, while checking the current and voltage under a certain condition (no-load, idling), CD is increased little by little, and the point where FD is smaller than CD becomes the present condition for the battery system.

As a result, according to the second embodiment of the present invention, the current through the field coil (primary coil) is directly controlled by the CD control, the FD feedback control, and the current monitoring. The duty value at which the battery voltage is corrected is detected as the FD signal to achieve the feedback. Further, the battery voltage can be set at a selective value. Also, a threshold for the power generation cut of the alternator 8 (low-grade charge control) can be calculated from the total current, which eliminates the possibility of the excessive total load current of the electric load without the EL switch 56. Power generation current by the alternator 8 can be calculated from FD and the engine speed, so that the state of charging/discharging of the battery 6 can be monitored if the current monitor is disposed toward a load side. Further, the condition of the battery 6 can be determined from the charging quantity and the voltage of the battery. In winter, the battery 6 is of high resistance and the voltage becomes high relative to the current. The battery 6 can be protected by decreasing the discharge of the battery 6 and increasing the power from the alternator 8. Still further, the life of the battery 6 can be determined from an ambient temperature or solution temperature of the battery 6.

Specifically, the battery voltage can be set at a certain voltage in the C terminal duty control (CD control). Also, at start and acceleration of the vehicle in which the engine load should be decreased, the load of the alternator 8 can be decreased, which improves performance of the engine 2.

Moreover, during field current duty monitoring (feedback), the condition of the electric load current including the load of the battery 6 can be determined. Since the condition of the battery 6 can be determined, the condition of the power generation cut of the alternator 8 may be broader, thereby utilizing the regenerative current more effectively.

Further, in electric load monitoring by the current sensor 24, the EL switch 56 can be eliminated from the heavy load equipment (the air conditioner, the lights, the defrost device). The system can cover when the total current of the electrical elements of the small electric loads is large.

The present invention is not limited to the above, but is susceptible to various variations or modifications.

For example, the power generation cut of the alternator is performed according to ambient temperature or atmospheric pressure. When the vehicle goes up a slope, the power generation cut of the alternator is performed so as to reduce the engine load. When the vehicle goes down the slope, the regenerative power generation can be performed, and in addition to this, the power generation cut of the alternator can also be performed in consideration of the weight of the vehicle so as to protect the battery.

Power generation which the alternator is required to output may be predicted and controlled in view of the intended traveling distance and the state of running for the day determined from information from a navigation system and a traffic center, so as to allocate the power generation appropriately for the day.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A power generation controller for an alternator that is only capable of supplying power to a vehicle battery,
   wherein the alternator is driven by rotation of a crank pulley of a crankshaft of an internal combustion engine mounted on a vehicle through a belt entrained around the crank pulley to charge the battery,
   said power generation controller controls the output of the alternator according to a duty value which is determined by a ratio between the duration the alternator is deactivated and the duration the alternator is activated, the alternator being deactivated to stop power generation when an external input signal is received and being activated to generate power when the external input signal is not received and to a battery voltage, which change in accordance with a running state of the vehicle and/or a driving state of said engine, wherein a current detector detects a current to be used by an electric load on the vehicle, a control unit comprises a field current control section, a field current monitor section, and an output control section, said field current control section controlling a field current of said alternator, said field current monitor section monitoring a field current value which is a controlled state of the field current of said alternator, and said output control section correcting the power output by said alternator according to the field current duty value monitored by said field current monitor section, and/or a load current value detected by said current detector.

2. The power generation controller for the alternator as defined in claim 1, wherein said control unit prevents said alternator from generating power by said output control section when a change-gear in a transmission in connection with said engine is shifted from first to second speed at startup, during acceleration of the vehicle, and when the load current value detected by said current detector is less than a predetermined value.

3. The power generation controller for the alternator as defined in claim 1, wherein said control unit, simultaneously with fuel cut of said engine of a hybrid vehicle, enables said alternator to start regenerative generation by said output control section during deceleration of the vehicle.

4. The power generation controller for the alternator as defined in claim 1, wherein said control unit sets said external input signal provided to said power generation controller of said alternator at a predetermined value when said current detector detects the electric load in the vehicle.

5. The power generation controller for the alternator of claim 1, wherein said alternator only selectively supplies power to said battery and provides no power to said crankshaft.

6. The power generation controller for the alternator of claim 1, wherein said power generation controller comprises a regulator circuit for said alternator, said regulator circuit preventing charging of said battery in all instances when the battery voltage is greater than a predetermined maximum value and said regulator circuit requiring charging of said battery in all instances when the battery voltage is less than a predetermined minimum value.

7. A method for controlling an alternator in a vehicle having an internal combustion engine comprising the steps of:

providing a belt entrained around a crank pulley of a crankshaft of the engine for driving the alternator by rotation of the crank pulley;

providing a regulator circuit for said alternator;

controlling the power output of the alternator in response to an external input signal to have a duty value which is determined by a ratio between a duration the alternator is deactivated and a duration the alternator is activated, deactivating of the alternator stopping power generation when the external input signal is received, and activating of the alternator generating a power output when the external input signal is not received, and controlling the power output in response to the battery voltage which changes in accordance with at least one of a running state of the vehicle and a driving state of the engine;

providing a control unit having a field current control section, a field current monitor section, and an output control section;

detecting a current used by an electric load of the vehicle with a current detector;

wherein said control unit sets the duty value provided to said alternator at a predetermined value when said current detector detects the electric load in the vehicle by at least one of:

monitoring a field current value which is a controlled state of the field current of the alternator with the field current monitor section and controlling a field current of the alternator with the field current control section; and controlling the external input signal provided to the regulator circuit of said alternator.

8. The method of claim 7, including the step of allocating the output of power by the alternator during a time period based on an intended traveling distance and a predicted state of running operation determined by information from a navigation system and a traffic center.

9. The method of claim 7, including sensing the vehicle being driven up a slope so that power generation cut of the alternator is performed to reduce engine load, and including sensing the vehicle being driven down a slope so that regenerative power generation can be performed.

10. The method of claim 7, including the steps of:

comparing the voltage of said battery to a predetermined minimum value and a predetermined maximum value;

when the voltage of said battery is less than the minimum value, controlling the output of the alternator in all instances to charge the battery; and when the voltage of said battery is greater than the maximum value, controlling the alternator in all instances to prevent any charging of the battery.

11. In a vehicle having an internal combustion engine, the combination of:

an alternator connected with a belt that is powered by a shaft driven by the internal combustion engine;

a battery connected to receive power from an output of the alternator;

a current sensor for sensing current from the battery to an electric load of the vehicle;

an acceleration switch;

an idle switch; and a power generation controller for the alternator, the power generation controller for receiving an external output and in response thereto, providing power to the battery; and a control unit for receiving inputs from the current sensor, the idle switch, and the acceleration switch to provide the external output to control the alternator, the control unit comprising:

a field current control section for limiting power from passing to the alternator when the voltage of the battery is greater than a large reference voltage;

a field current monitor section for monitoring a field current duty value of the alternator; and an output control section for providing an external output preventing power generation by the alternator 1) when a gear in a gear transmission is changed from low speed to a second speed or 2) when the electric load current value detected by the current sensor is less than a predetermined value, wherein the output control section provides the external output enabling power generation by the alternator during deceleration and the alternator only supplies power to the battery or provides no output to the battery.

12. The combination of claim 11, said power generation controller further comprising a fuel cut control section for cutting fuel to the engine simultaneously with the power generation of the alternator during deceleration of the vehicle.

13. The combination of claim 12, including a regulator circuit for said alternator, said regulator circuit enabling power to pass from the alternator to the battery in every instance when the voltage of the battery is less than a first predetermined value and said regulator circuit preventing the alternator from generating power and passing the power to the battery when the voltage of the battery is greater than a second predetermined value.

14. The combination of claim 13, wherein the first predetermined value comprises less than 12.8 volts and the second predetermined value comprises at or above 14.5 volts.

15. The combination of claim 11, wherein the external output of said output control section controls the amount of power output from alternator by a duty value that is determined by a ratio between a duration the alternator is deactivated and a duration that the alternator is activated.

16. The combination of claim 15, wherein the alternator is activated when the external output is not received and deactivated when the external output is received.

* * * * *